(12) United States Patent
Poustchi et al.

(10) Patent No.: US 7,899,172 B2
(45) Date of Patent: Mar. 1, 2011

(54) CALL FORWARDING SYSTEMS, METHODS AND NETWORK DEVICES

(75) Inventors: Behrouz Poustchi, Kanata (CA); Natalie Ann Gagnon, Carleton Place (CA); Vineet Seth, Kanata (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 2070 days.

(21) Appl. No.: 10/760,530

(22) Filed: Jan. 21, 2004

(65) Prior Publication Data

US 2004/0258233 A1 Dec. 23, 2004

Related U.S. Application Data

(60) Provisional application No. 60/441,121, filed on Jan. 21, 2003.

(51) Int. Cl.
*H04M 3/42* (2006.01)
*H04M 7/00* (2006.01)

(52) U.S. Cl. .............. 379/211.02; 379/211.01; 379/212.01; 379/221.01; 455/417

(58) Field of Classification Search ........... 379/211.02, 379/221.01, 215.01, 211.01, 88.17, 221.04, 379/212.01; 455/417; 370/356
See application file for complete search history.

(56) References Cited

U.S. PATENT DOCUMENTS

| | | | |
|---|---|---|---|
| 5,195,131 A * | 3/1993 | Sano | 379/211.02 |
| 5,963,620 A | 10/1999 | Frankel et al. | 379/93.05 |
| 6,088,437 A * | 7/2000 | Amick | 379/211.02 |
| 6,144,671 A | 11/2000 | Perinpanathan et al. | 370/409 |
| 6,327,356 B1 * | 12/2001 | Malik | 379/215.01 |
| 6,337,858 B1 * | 1/2002 | Petty et al. | 370/356 |
| 6,353,660 B1 * | 3/2002 | Burger et al. | 379/88.17 |
| 6,466,662 B1 | 10/2002 | Klaghofer et al. | 379/212.01 |
| 7,072,457 B2 * | 7/2006 | Brown et al. | 379/211.01 |
| 2002/0086710 A1 | 7/2002 | Humes | 455/564 |
| 2002/0136182 A1 | 9/2002 | Bardehle | 370/338 |
| 2002/0137498 A1 * | 9/2002 | Goss et al. | 455/417 |
| 2003/0112956 A1 * | 6/2003 | Brown et al. | 379/221.01 |

OTHER PUBLICATIONS

SIP Service Examples [online], Retrieved from the Internet <URL:http://www.softarmor.com/wgdb/docs/draft-ietf-sip-service-examples-03.txt.>.
"The Refer Method draft-ietf-sip-refer-04"; Network Working Group Internet Draft, XX, XX; May 14, 2002; pp. 1-16.

(Continued)

*Primary Examiner*—Thjuan K Addy
(74) *Attorney, Agent, or Firm*—Muncy, Geissler, Olds & Lowe, PLLC

(57) ABSTRACT

In call forwarding of a call there is an original calling network device, an original recipient of an incoming call, and a forwardee of the call. Systems, network devices, and methods are provided for delivering local call forwarding functionality. Each network device is capable of functioning in the capacity of any one or more of the above three roles, namely, originator, original recipient, and forwardee by providing local call forwarding functionality. In some implementations there is no central processing equipment used to provide local call forwarding functionality for forwarding calls. Furthermore, a network device may provide a call forwarding destination on behalf of another network device when the other network device cannot be reached.

37 Claims, 13 Drawing Sheets

OTHER PUBLICATIONS

Using SIP for Peer-to-Peer Third-Party Call Control [online], Retrieved from the Internet <URL:http://www.iptel.org/info/players/ietf/callprocessing/3pcc/draft-mahy-sip-peer-3pcc-00.txt>>.

SIP Telephony Device [online], Retrieved from the Internet <URL:http://www.watersprings.org/pub/id/draft-sinnreich-sipping-device-requirements-00.txt>>.

* cited by examiner

| DN | MAC ADDRESS | IP ADDRESS | DEVICE STATUS | BACKUP 1 | BACKUP 2 |
|---|---|---|---|---|---|
| 201 | 00-05-78-6B-44-A7 | 192.168.1.1 | 1 | 202 | 205 |
| 202 | 00-05-78-6B-44-A8 | 192.168.1.2 | 1 | 201 | 203 |
| 203 | 00-05-78-6B-44-A9 | 192.168.1.3 | 1 | 202 | 204 |
| 204 | 00-05-78-6B-44-B0 | 192.168.1.4 | 1 | 203 | 205 |
| 205 | 00-05-78-6B-44-B1 | 192.168.1.5 | 1 | 201 | 204 |
| T01 | 00-05-78-6B-44-B2 | 192.168.1.6 | | | |

FIG. 5

CALL FORWARDING SYSTEMS, METHODS AND NETWORK DEVICES

RELATED APPLICATIONS

This Application claims the benefit of U.S. Provisional Application No. 60/441,121 filed Jan. 21, 2003 which is hereby incorporated herein by reference.

FIELD OF THE INVENTION

This invention relates generally to call forwarding systems, methods and network devices in for example distributed peer-to-peer communications networks.

BACKGROUND OF THE INVENTION

Some modern communications solutions are based on VoIP (Voice-over IP (Internet Protocol)) technology, which is the transmission of calls over a data network based on the IP. The communication is in the form of packet data and thus there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation Protocol). These standards are followed when designing new hardware and software. The SIP standard covers the technical requirements to set-up, modify and tear down multimedia sessions over the Internet. A multimedia communication session between two endpoints will be referred to as a call.

Communication solutions, whether they be switch based or packet based, are defined and designed for a specific number of users and call processing capacity, generally defined by the number of ports (telephone terminations), and the amount of processing available on a central processing equipment that provides routing and call processing functionality. Hence, equipment vendors generally develop and market versions of the same product for different customer size and needs. However, a customer needs to upgrade to larger central processing equipment once the number of ports required and/or call-processing requirements exceed the capacity of the central processing equipment.

Current multimedia communication systems use a central processing equipment and simple user terminal sets. These simple user terminal sets are referred to as "stimulus terminals" as they simply send user stimuli such as key presses to the central processing equipment. In large systems, the central processing equipment is generally a very powerful computer controlling a number of functions on circuit boards called line cards, which connect telephone sets to the computer. The central processing equipment receives hook-switch information and key presses known in the art as DTMF (Dual Tone Multi-Frequency) tones from the telephone sets, and provides feedback to the telephone sets for example by sending a dial-tone or a ringing tone to the telephone sets. By interpreting the key presses, the central processing equipment controls the interconnection of the telephone sets based on numbers dialed by the telephone sets.

Call forwarding has been provided as part of the central call processing equipment. A trusted entity instructs the central call processing equipment to forward any received calls for a specific telephone set to another telephone set or voice mail under specific conditions. The specific conditions include forwarding to another telephone set a call which is not answered after a specified number of rings or a call which is destined for a telephone set that is in use (busy with another call). Such a call forwarding system is not well suited for scalability and, as discussed above, when the capacity of the central call processing equipment is exceeded an upgrade is required.

SUMMARY OF THE INVENTION

In a call forwarding of a call there is an original calling network device, an original recipient of the call, and a forwardee of the call. Systems, network devices, and methods are provided for delivering call forwarding functionality in a manner such that the call processing involved is performed locally on the network devices themselves without the requirement for central processing equipment. Each network device is capable to function in the capacity of any one or more of the above three roles, namely originator, original recipient, and forwardee by providing local call forwarding functionality. As the requirement for central processing equipment is removed, network devices can be added to a system without incurring high costs of replacing central processing equipment when a system becomes large. Furthermore, a network device may provide a call forwarding destination on behalf of another network device when the other network device cannot be reached. These features enhance system availability and reliability over systems that make use of central call processing for call forwarding.

In accordance with a broad aspect, the invention provides a network device adapted to receive an incoming call. The network device has a call forwarding function adapted to: if the incoming call was intended for an other network device, look-up a call forwarding destination on behalf of the other network device, and respond to the incoming call with the call forwarding destination.

In accordance with another broad aspect, the invention provides a network device adapted to receive an incoming call. The network device has a call forwarding function adapted to: if the incoming call was intended for an other network device, look-up a call forwarding destination on behalf of the other network device, and initiate a connection with a network device having the call forwarding destination.

In accordance with another broad aspect, the invention provides a network device adapted to participate in call forwarding. The network device has a call forwarding function. For a call initiated with a first other network device, if the first other network device cannot be reached the call forwarding function is adapted to: i) look-up a destination address for a second other network device; ii) initiate an other call to the second other network device; and iii) responsive to a receiving a first message from the second other network device containing a call forwarding destination, respond with a second message to a network device having the call forwarding destination for setting up another call, the call forwarding destination being obtained by the second other network device on behalf of the first network device.

In accordance with another broad aspect, the invention provides a network device adapted to participate in forwarding of a call from the network device to a first other network device. The network device has a call forwarding function adapted to: responsive to receiving a first message from a second other network device for replacing the call with another call with the second network device, establishing a media path with the second other network device.

In accordance with another broad aspect, the invention provides a network device adapted to participate in call forwarding of call from a first other network device to a second other network device. The second other network device initiates another call to the network device. The network device has a call forwarding function adapted to establish a media path with the first other network device.

In accordance with another broad aspect, the invention provides a system in a network having a plurality of network devices each capable of accessing the network. Each network device has a call forwarding function adapted to: a) as an original destination network device, upon receipt of a first call: i) look-up a call forwarding destination; and ii) provide destination information associated with the call forwarding destination of a network device from which the first call originates; and b) as an originator network device of a second call responsive to receiving a message containing destination information of an other network device, establish a media path with the other network device.

In accordance with another broad aspect, the invention provides a system in a network having a plurality of network devices each capable of accessing the network. Each network device has a call forwarding function adapted to: a) as an original destination network device, upon receipt of a first call: i) look-up a call forwarding destination; and ii) send a first message to a network device having the call forwarding destination for setting up a call with the network device having the call forwarding destination; and b) as an originator network device of a second call: responsive to receiving a second message containing destination information of an other network device, establishing a media path with the other network device.

In accordance with another broad aspect, the invention provides in a network device, a method that involves responsive to receiving an incoming call from a first other network device: if the incoming call was intended for an other network device, looking-up a call forwarding destination on behalf of the other network device, and responding to the incoming call with the call forwarding destination.

BRIEF DESCRIPTION OF THE DRAWINGS

Preferred embodiments of the invention will now be described with reference to the attached drawings in which:

FIG. 5 is a routing table of a terminal set of FIG. 1;

DETAILED DESCRIPTION

Embodiments of the invention provide a call forwarding system which is implemented locally on network devices. In call forwarding systems, a user enables call forwarding using any suitable method such as pressing a call forwarding key on a network device and entering a call forwarding destination for example. Once call forwarding has been enabled, calls that are then received at the network device which are intended for the network device are forwarded to a network device having the call forwarding destination. In some embodiments of the invention, network devices in a network provide call forwarding functionality locally. In some embodiments of the invention, this call forwarding functionality can be implemented as part of a call processing capability that incorporates other call processing features. An example implementation of an embodiment of the invention will be described with reference to FIGS. 1 to 6 in the context of call processing on a peer-to-peer distributed network which incorporates call forwarding.

Figure 1:
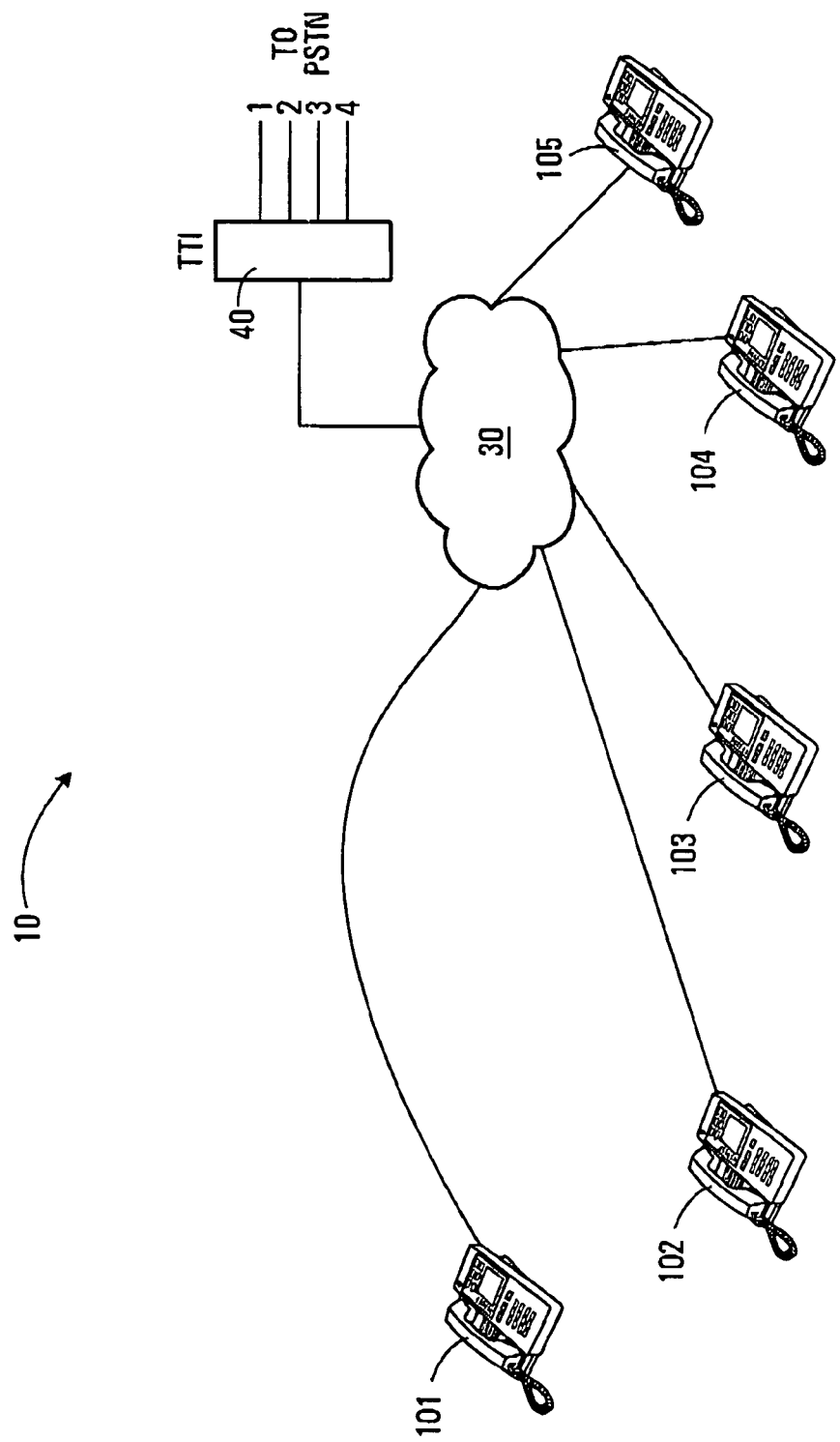
FIG. 1 is an example implementation of a system that makes use of network based distributed peer-to-peer call processing.

Referring to FIG. 1, shown is an example implementation of a system generally indicated by 10 which makes use of network based distributed peer-to-peer call processing. In addition to call forwarding, in the example, call processing functionality such as call transfer, call park and pickup, voice mail, and paging, and other features such as time synchronization, backup features, and peer discovery, may be provided locally at network devices within a network. Such features and functionality are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application entitled "PEER-TO-PEER DISCOVERY SYSTEM, METHOD AND NETWORK DEVICES" <60/518,646 filed Nov. 12, 2003; U.S. Provisional Patent Application entitled "PEER BACK-UP IN A DISTRIBUTED PEER-TO-PEER NETWORK: SYSTEM, METHOD AND NETWORK DEVICES" <60/523,703 filed Nov. 21, 2003; U.S. Provisional Patent Application entitled "TIME SYNCHRONIZATION OF NETWORK DEVICES IN A NETWORK: SYSTEM, METHOD AND NETWORK DEVICE" <60/523,140 filed Nov. 19, 2003; U.S. Provisional Patent Application entitled "SYSTEM, METHOD AND NETWORK DEVICES FOR PAGING IN A NETWORK" <60/524,041 filed Nov. 24, 2003; U.S. Patent Application entitled "VOICE MAIL SYSTEM, METHOD AND NETWORK DEVICES" <10/740, 405 filed Dec. 22, 2003, all of which are incorporated herein by reference. It is to be clearly understood that embodiments of the invention are also provided which only provide call forwarding functionality.

The system 10 has a TTI (Thin Trunk Interface) 40 and five terminal sets 101, 102, 103, 104, 105 on a network 30. The network 30 may be for example a LAN (Local Area Network). In the example of FIG. 1 there are five terminal sets 101, 102, 103, 104, 105; however, more generally there are a total of N terminal sets where N≧2. Furthermore, in some implementations N can be a large number, for example in the thousands. The TTI 40 is, for example, a basic Analog or digital T1/E1 interface or any other suitable PSTN interface and provides a local central office or PSTN (Public Switched Telephone Network) interworking interface. The TTI 40 is coupled to a number of telephone "lines" 1, 2, 3, 4. Lines 1, 2, 3, 4 are wire pairs representative of facilities provided by a local central office or PSTN (not shown). In some implementations, there are many lines requiring multiple thin trunk interfaces. For example, in one implementation, 8 lines are required for connection to the PSTN and a second thin trunk interface is added to the system 10. It is to be understood that the system 10 of FIG. 1 is only a specific example of the incorporated subject matter. For example, in some implementations the network 30 form part of a larger network that is a collection of smaller networks interconnected by way of VPN (Virtual Private Network) connections for example.

In another example implementation there are two or more networks each having a TTI and at least one network device capable of providing call forwarding functionality locally. An external call received from a network device on another network is routed through a respective TTI on the network on which the network device intended to receive the call resides. The network device receiving the external call provides local call forwarding functionality for the external call if required. In the event that the network device intended to receive the call is unavailable the TTI through which the call is routed re-routes the call to another network device designated as a backup network device for the network device originally intended to receive the call.

Unlike conventional systems, the system 10 of FIG. 1 features distributed call processing, and a number of capabilities including distributed call forwarding.

Figure 2:
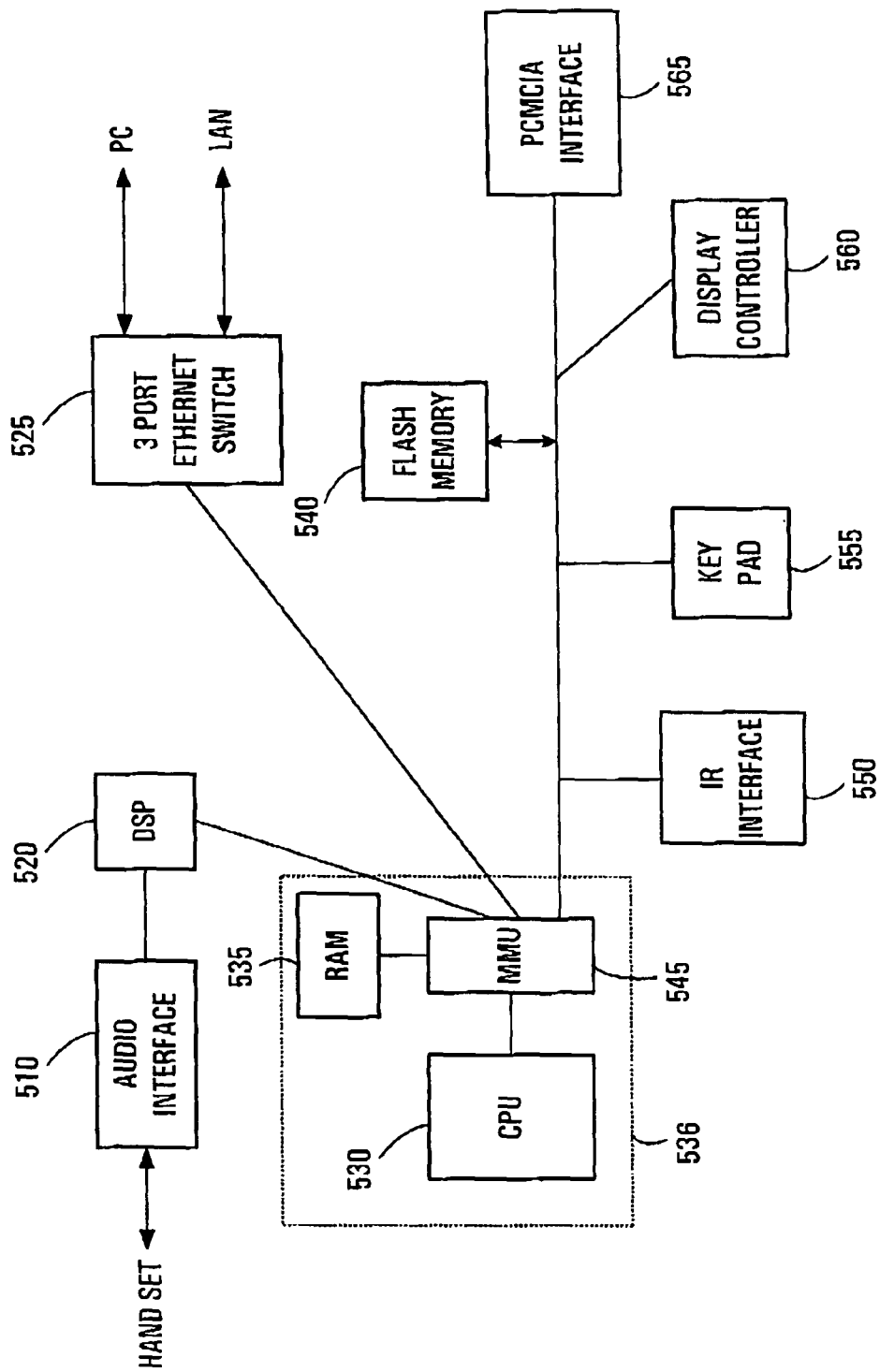
FIG. 2 is a partial circuit block diagram of a terminal set of the system of FIG. 1.

Referring to FIG. 2, shown is a partial circuit block diagram of terminal set 101 of FIG. 1. Terminal sets 102, 103, 104, 105 are similar to terminal set 101 and have a circuit that can be equally represented by the partial circuit block diagram of FIG. 2. A CPU (Central Processor Unit) 530, a MMU (Memory Management Unit) 545 and a RAM (Random Access Memory) 535 form a processing device 536. The processing device 536 is connected to a Digital Signal Processing (DSP) 520 for encoding and decoding audio signals. The DSP 520 is connected to an audio interface 510. The processing device 536 is also connected to a 3-port switch 525 to allow connection to the LAN 30 and/or a PC (Personal Computer). The processing device 536 is also connected to a non-volatile flash memory 540, an IR (Infra-Red) interface 550, a Keypad and button interface 555, an LCD (Liquid Crystal Display) controller 560, and a PCMCIA (Personal Computer Memory Card International Association) Interface 565 to allow for standardized expansion of the terminal set 101. While a specific architecture is shown in FIG. 2, it is to be understood that the invention is not limited to the architecture shown in FIG. 2. More generally, in some implementations, a portion of or all of the functionality provided by the partial circuit block diagram of FIG. 2 is implemented on any network device, such as a terminal set, the TTI 40, and a PC (Personal Computer) for example. Preferably, the network device is a packet based telephone such as an VoIP (Voice over Internet Protocol) telephone terminal set. Other examples are video phone, a PDA (Personal Digital Assistant), a soft phone, a wireless device, or a wireless telephone that can be suitably programmed and configured to provide the distributed call forwarding functionality described below. In some cases, the terminal sets are for example IP phones such as that manufactured by Mitel, Nortel, Avaya, Siemens, NEC, Pingtel or 3COM.

Figure 3:
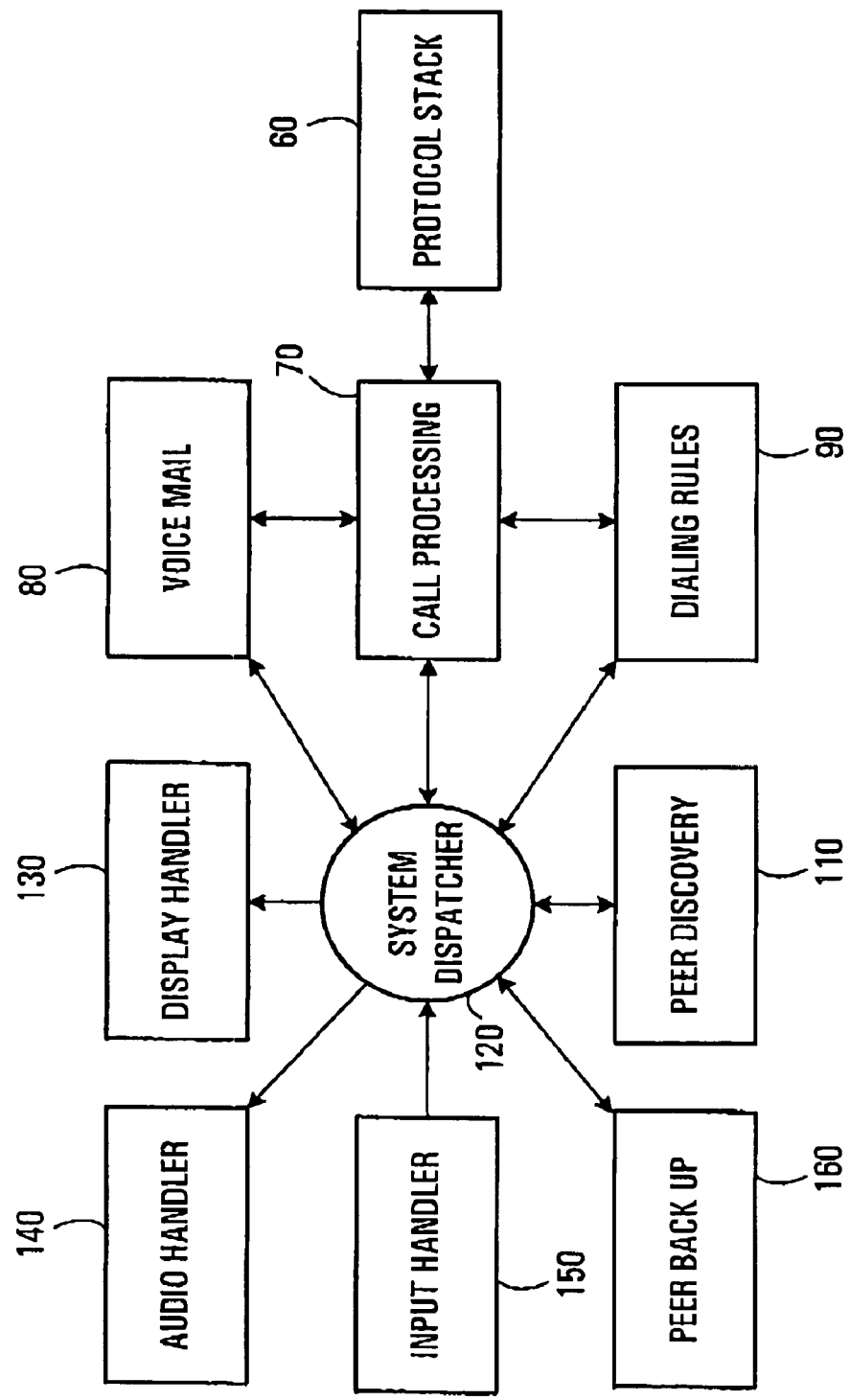
FIG. 3 is a functional block diagram of software operating on a terminal set of FIG. 1.

Referring to FIG. 3, shown is a functional block diagram of software operating on terminal set 101 of FIG. 1. The software will be described as operating on terminal set 101; however, it is to be understood that similar software is implemented in terminal sets 102, 103, 104, 105. Furthermore, in some cases, at least some of the features of the software described below are implemented in any network device such as the TTI 40 for example. The software is stored in RAM 535 of FIG. 2 and runs on the CPU 530. More generally, the software can be implemented as any suitable combination of instructions stored in memory for execution by general or special purpose processors, firmware, ASICs (Application Specific Integrated Circuits), FPGAs (Field-Programmable Gate Arrays), and general or special purpose logic. A system dispatcher 120 provides communication and scheduling between various functional elements which include a call processing module 70, a voice mail module 80, a dialing rules module 90, a peer discovery module 110, a display handler 130, an audio handler 140, an input handler 150, and a peer back-up module 160. The call processing module 70 also interfaces with a protocol stack 60.

FIG. 3 shows a detailed example of functions that may be included in a network device; however, it is to be understood that a network device need not have all of the functions shown in FIG. 3 and that in some implementations a network device will have only some of the functionality shown in FIG. 3. The display handler 130 formats information and displays the information to a user. The input handler 150 monitors inputs from for example key presses, hook switch, volume keys, and hands free and mute buttons and informs the system dispatcher 120. The system dispatcher 120 then distributes messages to other modules for further appropriate action to be taken. The audio handler 140 plays audio tones such as ringing, busy, and call waiting tones and/or connects to a handset speaker or speaker phone through a media call upon receipt of an audio message from the system dispatcher 120.

When terminal set 101 is initially connected to the network 30 it performs a peer discovery by executing the peer discovery module 110. At this point terminal set 101 undergoes a discovery of peer network devices such as terminal sets 102, 103, 104, 105 and TTI 40 by way of messages between terminal set 101 and terminal sets 102, 103, 104, 105 and TTI 40. Once the peer terminal sets are discovered, information is exchanged between the terminal set 101 and the peer network devices. At least part of the information exchanged in the messages is included in a routing table illustrated by way of example as shown in FIG. 5. The routing table is generally indicated by 200 and contains routing information for each of terminal sets 101, 102, 103, 104, 105 and TTI 40. A column 210 contains a DN (Directory Numbers) for each terminal 101, 102, 103, 104, 105. For example, in one case terminal sets 101, 102, 103, 104 have DNs 201, 202, 203, 204, 205 respectively. The DN uniquely identifies terminal sets 101, 102, 103, 104, 105 within the network 30. In the example implementation the TTI 40 is not a user dialable device. TTI 40 is given a different identifier T01 so that it can nonetheless be identified by other network devices. A column 220 has as entries a MAC (Media Access Control) address for each terminal set 101, 102, 103, 104, 105 and TTI 40. A column 230 has as entries an IP (Internet Protocol) address assigned to each terminal set 101, 102, 103, 104, 105 and TTI 40. A column 240 indicates a current device status of each terminal set 101, 102, 103, 104, 105 and TTI 40. For example, in one implementation a "1" indicates that a network device is up and running whereas a "0" indicates that the network device is un-available due to, for example, a failure.

In some implementations, a network device has one or more network devices designated to serve as backup network devices in the event the network device is unavailable to process a call. In particular, if a network device is unavailable to process a call, the call is re-directed to one of its designated backup network devices and the designated backup network device receiving the re-directed call provides call functionality for the network device that is unavailable. In the example of FIGS. 1 to 3, and 5 for each terminal set 101, 102, 103, 104, 105 there are two network devices designated as backup network devices which are identified in columns 260, 270 of the routing table 200. For example, network devices having DNs 202, 205 in columns 260, 270, respectively, are designated as backup network devices for terminal set 101 which has DN 201. In the example implementation, the TTI 40 (T01) is not backed up; however, as further discussed below in some implementations the TTI 40 is backed up by one or more network devices. As shown in the routing table 200, there are preferably two backup network devices designated for each network device; however, more generally, there is one or more backup network devices designated for each network device. In our example implementation, in columns 260, 270 the backup network devices are identified by their DNs for clarity. Some implementations make use of DNs to identify backup network devices as illustrated. In other embodiments of the invention, MAC addresses are maintained in columns 260, 270 to identify the backup network devices. Furthermore, any unique identifier for the network devices may be used. The routing table 200 is shown as an illustrative example of the type of routing information that might be maintained; however, the invention is not limited to the illustrative example of FIG. 5 and in other implementations fewer or additional routing information is maintained in the routing table 200. More generally, the routing table 200 may contain any information on network devices, which is maintained for providing local functionality such as voice mail, call transfer, call forward, paging, and backup functionality. Other information that may also be maintained in table 200 might be for example, network device type identifiers, timestamps for synchronization purposes, network class identifiers for identifying a network class on which a network device is connected, and activity indicators identifying whether network devices are active. For purposes of providing backup functionality entries in columns 260, 270 are maintained. On a more simplified level, each network device maintains an identification of its designated backup network devices and an address for each designated backup network device. In particular, when a new network device is added to the network 30, the network device makes use of its peer discovery module 110 to obtain routing information pertaining to other network devices in the network 30 and makes use of the peer backup module 160 to designate two other network devices as backup network devices. In some implementations, maintaining column 260, 270 involves periodically redistributing backup designations to prevent, for example, a network device form continuously providing backup functionality for another network device that is prone to failure. Periodic redistribution of backup designations provides a fair distribution of workload in providing voice mail backup functionality among the network devices.

Referring back to FIG. 3, the dialing rules module 90 contains and/or applies a set of dialing rules for the call-processing module 70, which control how calls are directed. As an example of a dialing rule, a dialing rule might allow a terminal set to apply one or a set of filters to numbers dialed and if a match is found then the call is routed via a specific route to its destination.

The call-processing module 70 interacts with the protocol stack 60 to set up and tear down calls, and to set up media calls. When a call is received and a user is unable to answer the call because he or she is taking another call or because he or she is away from the terminal set, then the call may be optionally handled by the voice mail module 80.

The call processing modules of a number of network devices collectively serve to deliver PBX-like (Private Branch Exchange-like) call processing capabilities in a distributed fashion without the need for a PBX (Private Branch Exchange). For example, the call processing module 70 of terminal set 101 handles calls not only intended for terminal set 101 but also handles calls for other network devices for which it has been designated as a backup terminal set. This allows the voice mail module 80 to handle calls for the other network devices for which terminal set 101 has been designated as a backup terminal set. With reference to columns 210, 260 of the routing table 200, the network devices having DNs 202 and 205 both have designated as a first backup network device the network device having DN 201. As such, the network device having DN 201 provides voice mail functionality for calls not only intended for itself but also for calls intended for the network devices having DNs 202, 205. In particular, when the network device having DN 202 is unavailable, the network device having DN 201 will serve as a backup network device to provide call processing and/or voice mail functionality for calls intended for the network device having DN 202. Similarly, when network device having DN 205 is unavailable, the network device having DN 201 will serve as a backup network device to provide call processing and/or voice mail functionality for calls intended for the network device having DN 205.

Figure 4:
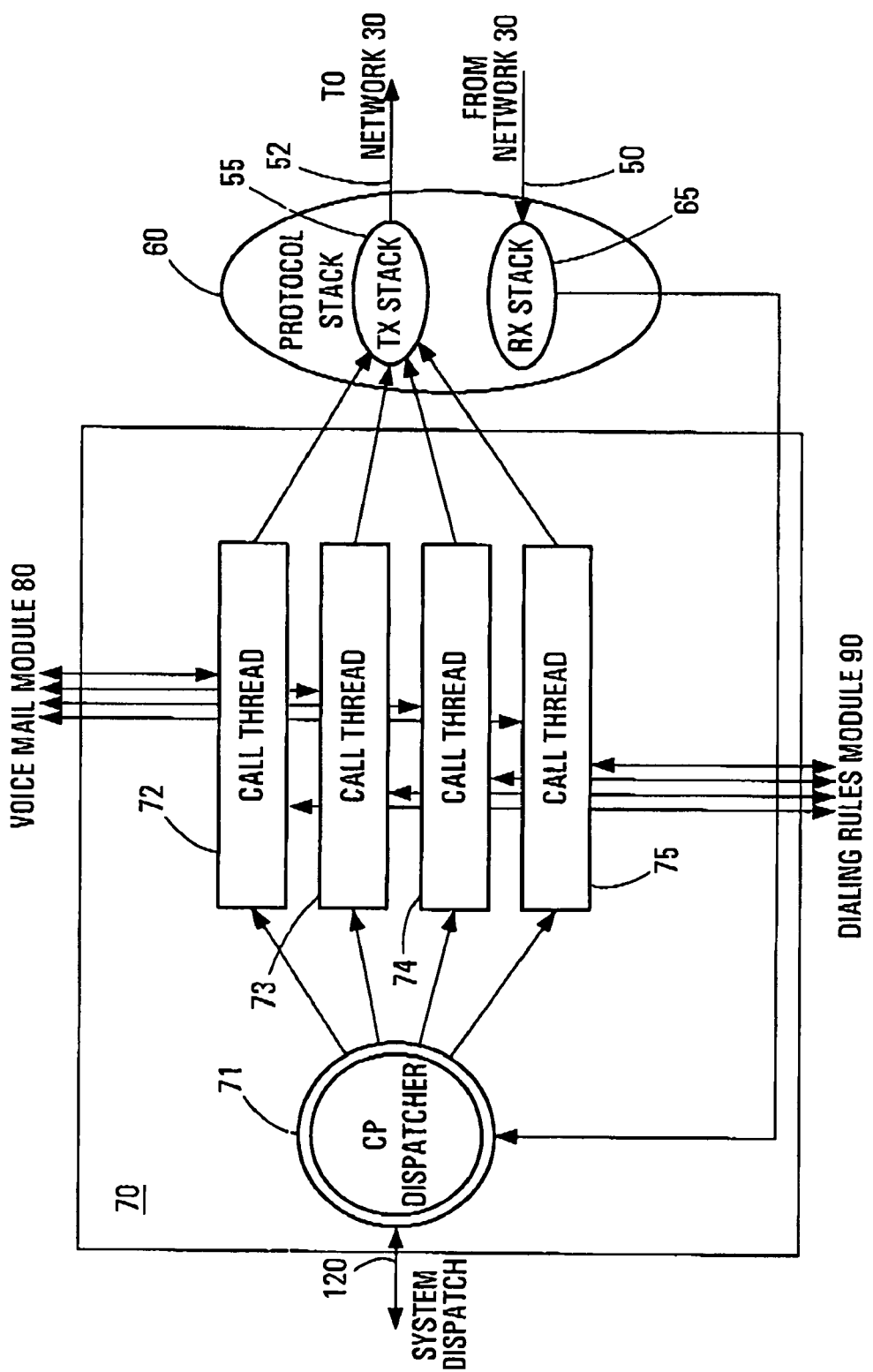
FIG. 4 is a functional block diagram of a call processing module of the software of FIG. 3.

An example implementation of the call processing module 70 together with the protocol stack 60 is shown in FIG. 4. In FIG. 4, the call processing module 70 has four call threads 72, 73, 74, 75 and a CP (Call Processor) dispatcher 71. The protocol stack 60 has a Tx (Transmit) stack 55 and an Rx (Receive) stack 65. Incoming calls are queued in the Rx stack 65 and outgoing calls are queued in the Tx stack 55. A channel 50 provides a connection to the network 30 for the incoming calls and a channel 52 provides a connection to the network 30 for the outgoing calls. The incoming and outgoing calls may be for example in the form of messages that are for example requests, responses to request, messages containing information such as routing information for other network devices, messages containing information such as routing information from other network devices, and messages containing media information. The requests may be for example, requests for establishing connections, requests for terminating connections, or media data such as voice.

Each of the call threads 72, 73, 74, 75 is capable of handling a respective call. For example, a media call received by the terminal set 101 may be processed by the call thread 72, while a voice mail message may be recorded simultaneously on call thread 73. In addition, the call thread 74 might at the same time be involved in recording a voice mail message intended for another network device for which terminal set 101 is designated as a backup. The CP dispatcher 71 manages the call threads 72, 73, 74, 75 and performs scheduling of incoming and outgoing calls. In addition, the four call threads 72, 73, 74, 75 provide a mechanism for simultaneously handling 3-way conferencing plus voice mail. The invention is not limited to four call threads and in other implementations, there are two or more call threads. In some implementations in which there are two call threads, the two call threads might be used to simultaneously handle an incoming call and another call intended for voice mail, paging, or call forwarding for example.

When an incoming message for a call arrives at the protocol stack 60 through channel 50, the incoming message is queued in the Rx stack 65 and then sent to the CP Dispatcher 71. The CP dispatcher 71 determines the thread 72, 73, 74, 75 to which the call is to be sent and forwards the message to the determined thread. Each call thread 72, 73, 74, 75 is capable of interfacing with the voice mail module 80, the dialing rules module 90, the peer discovery module 110, the display handler 130, the audio handler 140, the input handler 150, and the peer backup module 160. The call threads 72, 73, 74, 75 are shown interfacing with the voice mail module 80, the dialing rules module 90, and the CP dispatcher 71 only for purposes of clarity. The module or modules that a call thread interfaces with depends on the type of message being received or made. For example, if the message is intended for voice mail, the voice mail module 80 interfaces with the call thread. In response to the received message one of the call threads 72, 73, 74, 75 interfacing with one or more of the modules if necessary and generates a response message to the Tx stack 55 of the protocol stack 60 to be packaged and sent to a destination network device. The message contains information provided by one or more of the modules 80, 90, 110, 130, 140, 150, 160. The type of message being sent back to the network 30 depends on the state of the call thread. If, for example, the call received corresponds to an INVITE message for initiating a new call under a SIP (Session Initiation Protocol) then the response is an appropriate acknowledgement such as a RINGING message indicating that the terminal set is zinging or an OK message indicating that the call has been answered.

Figure 6:
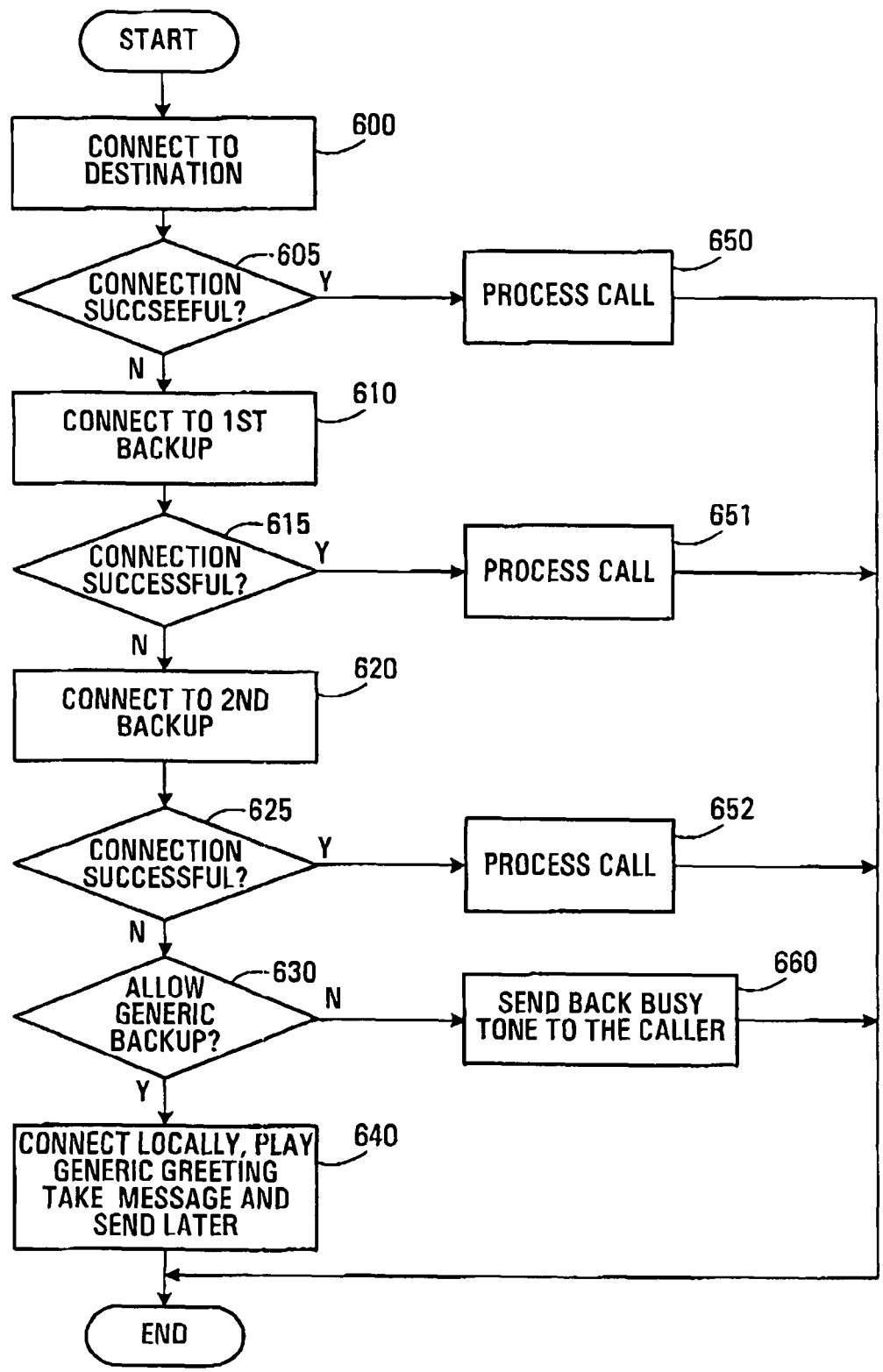
FIG. 6 is a flow chart of a method of initiating a call from one network device to another network device which might for example be employed in the system of Figure

Referring to FIG. 6, shown is a flow chart of a method of initiating a call from one network device to another network device which might for example be employed in the system 10 of FIG. 1. In particular, a caller at an originator network device wishes to call a person at a destination network device. At step 600, the originator network device attempts to establish a connection for a call with the destination network device. At step 605, if the connection is established the call is processed (step 650). The attempt may be unsuccessful due to for example one or more of a network failure, failure at the destination network device, the destination network device being unplugged and lack of resources at the destination network device to process a call. In some cases, the lack of resources might be due to for example all call threads at the destination network device being used simultaneously. At step 605 if the attempt is unsuccessful, then the originator network device looks up its routing information to determine which network device is to serve as a first backup network device for the destination network device and to determine an address for the first backup network device. The originator network device then initiates a call to the first backup network device by attempting to establish a connection using the address of the first backup network device (step 610). At step 615, if the attempt is successful and a connection is established with the first backup network device, the call is processed (step 651). Again, the attempt at the connection with the first backup network device may be unsuccessful and at step 615, if the attempt of step 610 fails, then the originator network device looks up its routing information to determine which network device is to serve as a second backup network device for the destination network device and to determine an address for the second backup network device. The originator network device then initiates a call to the second backup network device by attempting to establish a connection using the address of the second backup network device (step 620). At step 625, if the attempt is successful and a connection is established with the second backup network device, the call is processed (step 652). The originator network device has a generic call processing capability that allows the originator network device to take the call locally and provide voice mail functionality locally using a generic greeting. In particular, there is a user option for enabling the generic call processing capability. At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call is recorded and later sent to the destination network device when the destination network device becomes available (step 640). At step 630, if the generic voice mail functionality is disabled a busy tone is played to the caller (step 660).

In the example of FIG. 6, it is assumed that for steps 600, 610, 620 the destination network device, the first backup network device, and the second backup network device, respectively, are available before a connection is attempted; however, in some implementations at the steps 600, 610, 620 a look-up in column 240 of the routing table 200 is performed to first determine whether a network device for which a connection is to be established is active. An attempt at a connection is then performed only if the network device is active.

Regarding processing at the destination network device, in one implementation at step 650 the call is processed with a ringing signal being generated for answering of the call by a user at the destination network device and only after a predetermined number of ring is a voice mail message taken. However, at steps 651, 652, 640, the call is directly processed by a call processing thread in cooperation with the voice mail module of the network device answering the call, whether it be a designated backup network device (step 651 or 652) or the originator network device (step 640).

Whether it be the destination network device (step 650), or one of the designated backup network devices (step 651 or 652), or the originator network device (step 640), the network device that accepts the call preferably does so in a manner that is unique to the original destination telephone set. This might for example involve having each network device maintain its own specific voice mail greeting and other greetings specific to the network devices the designated as backup network devices. Furthermore, in some implementations, each network device maintains user options for handling voice mail and call forwarding.

In the method of FIG. 6, each network device is assigned two other network devices as backup network devices and as such there are up to two attempts at establishing connections with network devices designated as backup network devices (steps 610, 620). More generally, a network device has M other network devices designated as backup network devices with M≧1 and successive attempts at establishing connections with the M backup network devices are performed until one of the attempts is successful. Again, in some implementations the status of a network device is first looked-up and an attempt at a connection with the network device is performed only if the status indicates that the network device is active. As such in some cases, there are 0≦N≦M attempts at establishing connections with backup network devices. If none of the attempts are successful then the call is handled locally as described with reference to steps 630, 640, 660. Furthermore, in some implementations, there is no generic call processing capability as described with reference to step 640 in which case when the attempt at step 625 is unsuccessful, the caller is provided with a busy tone (step 660).

In the example implementation of FIGS. 1 to 6, the TTI 40 is not backed up by another network device; however, in some implementation the TTI 40 is backed up by one or more other network devices. In some embodiments of the invention each network device is backed up by one or more network devices. Preferably, for each network device one or more network devices of the same type are designated as backup network devices. For example, in some embodiments of the invention a telephone terminal set has one or more other telephone terminal sets designated as backups and a TTI has one or more other TTIs designated as backups.

The method of FIG. 6 will now be described for a specific example in which a user at terminal set 101 of FIG. 1 attempts to make a call to terminal set 103. In this specific example terminal sets 101 and 103 correspond to the originator and destination network devices, respectively. In the specific example terminal sets 101, 102, 103, 104, 105 have DNs 201, 202, 203, 204, 205, respectively. As shown in columns 210, 260, 270 of the routing table 200, the network devices having DNs 202, 204 (terminal sets 102 and 104) are designated as backup network devices for the network device having DN 203 (the destination network device corresponding to terminal set 103). At step 600 terminal set 101 attempts to establish a connection for a call with terminal set 103. At step 605, if the connection is established the call is processed by terminal set 103 (step 650). At step 605 if the attempt is unsuccessful, then the terminal set 101 looks up its routing table 200 to determine from column 260 that terminal set 102 (DN 202) is to serve as a first backup terminal set for terminal 103 (DN 203) and determines from column 220 or 230 an address for terminal set 102. In some implementations, the call processing module 70 is responsible for retrieving the address of the first backup network device and for providing instructions for connecting to the first backup network device. The terminal set 101 then initiates a call to the terminal set 102 by attempting to establish a connection using the address of terminal set 102 (step 610). At step 615, if the attempt of step 610 is successful and a connection is established with terminal set 102, the call is processed by terminal set 102 (step 651). At step 615, if the attempt of step 610 fails, then terminal set 101 looks up its routing table 200 to determine from column 270 that terminal set 104 (DN 204) is to serve as a second backup terminal set for terminal 103 (DN 203) and to determine from column 220 or 230 an address for the terminal set 104. The terminal set 101 then initiates a call to terminal set 104 by attempting to establish a connection using the address of terminal set 104 (step 620). At step 625, if the attempt is successful and a connection is established with terminal set 104, the call is processed by terminal set 104 (step 652). At step 625, if the attempt of step 620 is unsuccessful, a determination of whether the generic call processing capability is enabled is determined (step 630). At step 630, if the generic call processing capability is enabled a connection is established locally, a generic voice mail greeting is played and a voice mail message from the caller initiating the call at terminal set 101 is recorded and later sent to terminal set 103 when terminal set 103 becomes available (step 640). At step 630, if the generic voice mail functionality is disabled a error tone such as a fast busy is played to the caller at terminal set 101 (step 660).

The method of FIG. 6 describes how a network device attempts to Establish a call and in some cases the call is answered by way of voice mail. The manner in which a network device participates in forwarding of a call using local call forwarding functionality will now be described.

Call Forwarding

Embodiments of the invention provide a call forwarding system, methods, and network devices for forwarding calls between an originator network device and another packet network device to a destination network device without the requirement of a switch or central processing equipment.

A first set of embodiments will be described with reference to FIGS. 8, 9, and 11. In these embodiments, forwarding is achieved by responding to incoming messages requesting call setups with messages which refer the original caller to a forwarding destination address. Further embodiments will be described with reference to FIGS. 12 and 13. In these embodiments, call forwarding is implemented by a network device on which call forwarding has been enabled by sending a request for a connection directly to a target forwarding address. These embodiments will each be described in detail below.

Figure 7A:
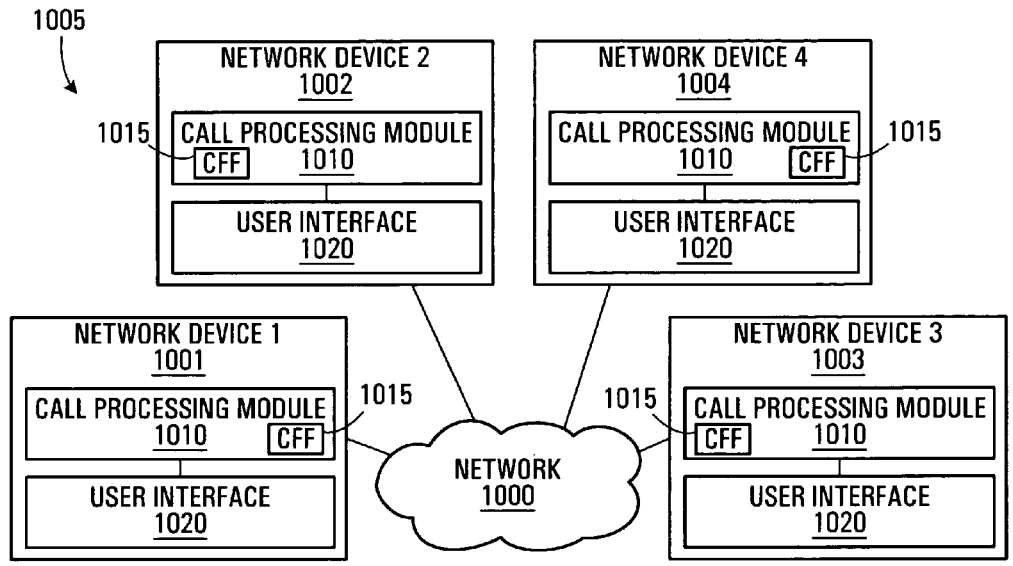
FIG. 7A is a basic block diagram of a distributed peer-to-peer network.

Referring to FIG. 7A shown is a basic block diagram of a distributed peer-to-peer network. In FIG. 7A shown are first, second, third and fourth network devices 1001, 1002, 1003, 1004 on a network 1000. Each network device 1001, 1002, 1003, 1004 has a call processing module 1010 having a CFF (Call Forwarding Function) 1015, and a user interface 1020. The call processing module 1010 of the network devices 1001, 1002, 1003, 1004 is adapted to process calls using the CFF 1015 to provide local call forwarding functionality. In some embodiments of the invention, the call processing functionality of the call processing module described above with reference to FIGS. 1 to 6 is implemented in the call processing modules 1010; however, it is to be clearly understood that in other embodiments only some of the call processing features described above are implemented and other call processing feature may also be implemented. The user interface 1020 is adapted to receive a user input enabling or disabling call forwarding to other network devices. In FIG. 7A, the CFF 1015 is implemented as part of the call processing module 1010; however, the invention is not limited to the CFF 1015 being implemented as part of the call processing module 1010 and in some embodiments of the invention the CFF 1015 is distinct from the call processing module 1010. In the description that follows, it is assumed that the CFF 1015 is implemented as part of the call processing module 1010. Furthermore, the CFF 1015 is implemented in any suitable way including software, hardware, or firmware for example.

Each network device 1001, 1002, 1003, 1004 may be for example a terminal set, a packet based telephone, a VoIP (Voice over Internet Protocol) telephone, a video phone, a PC (Personal Computer), a PDA (Personal Digital Assistant), a soft phone, a wireless device, or a wireless telephone suitably programmed and configured to provide call forwarding functionality.

For each network device 1001, 1002, 1003, 1004 the call processing module 1010 provides call forwarding functionality as one or more of an original calling network device, an original recipient of a call to be forwarded, and a forwardee of a call using the CFF 1015.

In some cases call forwarding is enabled/disabled through the user interfaces 1020. This can be implemented through keys or buttons which are specifically programmed to implement these functions. Alternatively, soft keys can be provided which provide these functions. Preferably, the user interface 1020 includes a mechanism for enabling and disabling call forwarding, a mechanism for specifying a target or destination network device (forwardee) to receive calls which are to be forwarded. Furthermore, in preferred embodiments, each network device has a one or more backup network devices defined within a network which provide backup processing as described previously with reference to FIG. 1 to 6; however, it to be understood that the invention is not limited to backup processing as described above and in some embodiments of the invention only some of the previously described backup processing features are implemented. Furthermore, other backup processing features may be implemented. Preferably, when the user interface 1020 of one of the network devices 1001, 1002, 1003, 1004 receives call forwarding instructions such as a call forwarding address, this information is also passed to the backup network devices so that they can handle the call forwarding functionality in the event the original network device cannot be reached. Once call forwarding is enabled, incoming calls intended for the network device receiving the incoming calls are forwarded to another network device. There are different conditions which can trigger forwarding of a call. For example, a setting might be used to forward all incoming calls. Another setting might be used to forward incoming calls when the network device is busy. Yet another setting might be used to forward incoming calls after N rings. Furthermore, a network device might be configured to forward a call to another network device using a call forwarding destination or forward the call for voice mail processing.

A call forwarding might be implemented on demand for example by providing a user input using the user interface 1020 with the user input containing a call forwarding destination. In addition, in some embodiments of the invention call forwarding data such as call forwarding destinations are distributed to each network device on a network. Alternatively, the call forwarding data is stored centrally on a file server for example.

Furthermore, preferably the user interface 1020 includes functionality for selecting between an unconditional call forwarding option, a call forwarding after N rings, and call forwarding on busy. The unconditional call forwarding option will forward the call as soon as it is received whereas the forwarding after N rings option will first ring the original destination some predetermined number of rings and then if the call is not answered the call forwarding function kicks in and forwards the call to an identified forwarding destination.

Figure 8A:
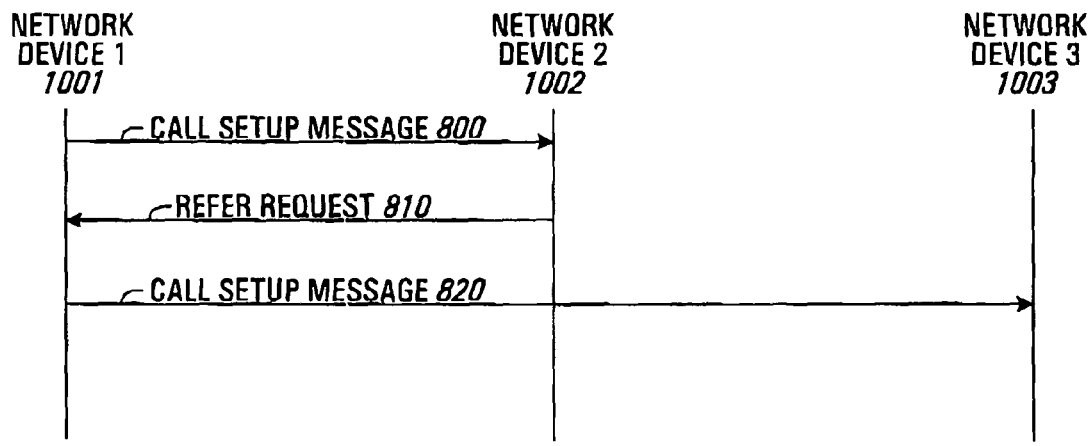
FIG. 8A is a signal flow diagram of the basic steps which take place in a call forwarding scenario, according to an embodiment of the invention.

Referring now to FIG. 8A, shown is a signal flow diagram of the basic steps which take place in a call forwarding scenario. As an illustrative example of a particular scenario, a call that originates from the first network device 1001 is directed to the second network device 1002 and then forwarded to the third network device 1003. However, it is to be understood that there are other possible scenarios. More generally, a call might originate from any one of network devices 1001, 1002, 1003, 1004; be received by any first other one of network devices 1001, 1002, 1003, 1004; and forwarded to a second other one of network devices 1001, 1002, 1003, 1004.

Firstly, a user at the first network device 1001 decides to initiate a call to a user at the second network device 1002 and the first network device 1001 sends a call setup message 800 to the second network device 1002. The second network device 1002 processes the call setup message 800 and determines whether or not the call requires to be forwarded, details of which are described herein below with reference to FIG. 10. When call forwarding is enabled, a call forwarding destination is looked-up for the second network device 1002 is obtained is packed in a REFER request 810 which is sent back to the first network device 1001. Preferably the call forwarding destination is looked-up locally at the second network device 1002 in for a example a table maintained by the network device 1002. Alternatively, the call forwarding destination is looked-up at a central location. The first network device 1001 receives the REFER request 810 and sends a new call setup message 820 to the third network device 1003 which corresponds to the call forwarding destination provided by second network device 1002 in the REFER request 810.

Figure 8B:
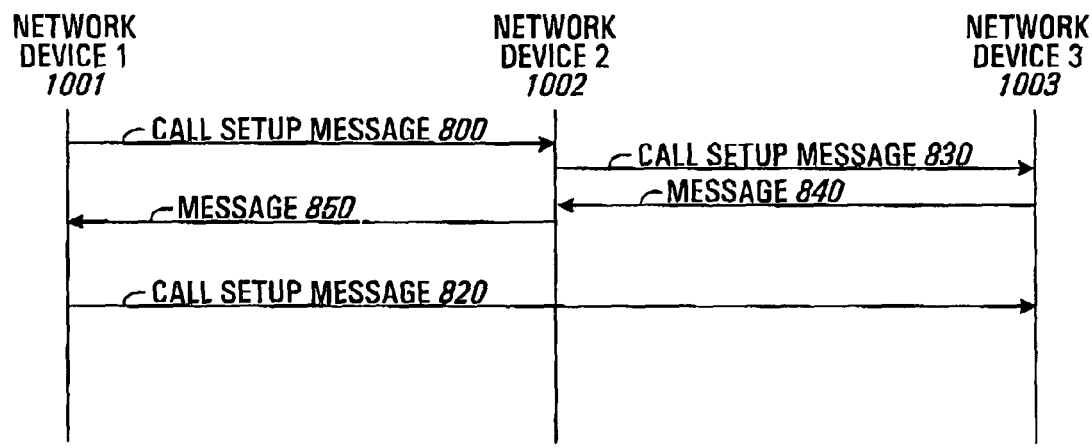
FIG. 8B is a signal flow diagram of the basic steps which take place in a call forwarding scenario, according to another embodiment of the invention.

Referring now to FIG. 8B, shown is a signal flow diagram of the basic steps which take place in a call forwarding scenario, in accordance with another embodiment of the invention. The messaging sequence is between the first, second, and third network devices 1001, 1002, 1003. A user at the first network device 1001 decides to initiate a call to a user at the second network device 1002 and the first network device 1001 sends call setup message 800 to the second network device 1002. The second network device 1002 processes the call setup message 800 and determines whether or not the call requires to be forwarded, details of which are described herein below with reference to FIG. 10. When call forwarding is enabled, a call forwarding destination of the third network device 1003 is looked-up and a call setup message 830 is sent to the third network device 1003. The third network device 1003 responds with message 840 which is sent to the second network device 1002. The second network device 1002 then sends a message 850 containing a reference to the third network device 1003 to the first network device 1001. The first network device 1001 then sends the call setup message 820 to the third network device 1003. In some implementations there is no message 840 being sent to the second network device 1002. Furthermore, in some embodiments of the invention the call setup message 830 contains a reference to the first network device 1001. In some of these embodiments the first and third network devices 1001, 1003 establish a media path with each other without the call setup message 820 being sent to the third network device 1003. In some embodiments of the invention, messages 840, 850 and 820 contain a reference to the call between the second and third network devices 1002, 1003. In some embodiments of the invention this reference to the call between the second and third network devices 1002, 1003 corresponds to a reference to the call between the first and second network devices 1001, 1002. In some embodiments of the invention, the call setup message 830 contains a reference to the first network device 1001 and the third network device 1003 sends message 840 directly to the first network device 1001 instead of the second network device 1002 in which case there is no message 850 being sent.

Another embodiment provides a system which consists of a network; a plurality of network devices each capable of accessing the network, each network device being adapted to perform local call forwarding. Each network device is preferably one of the above summarized network devices.

In yet another embodiment, the system 1005 also has a TTI (Thin Trunk Interface) connected to the network with the TTI having at least some call forwarding functionality. In this embodiment, for call forwarding to and from external network devices outside the network 1000, the TTI is adapted to provide local call forwarding functionality as a forwardee or an originator, respectively, for the external network devices outside the network 1000.

Figure 7B:
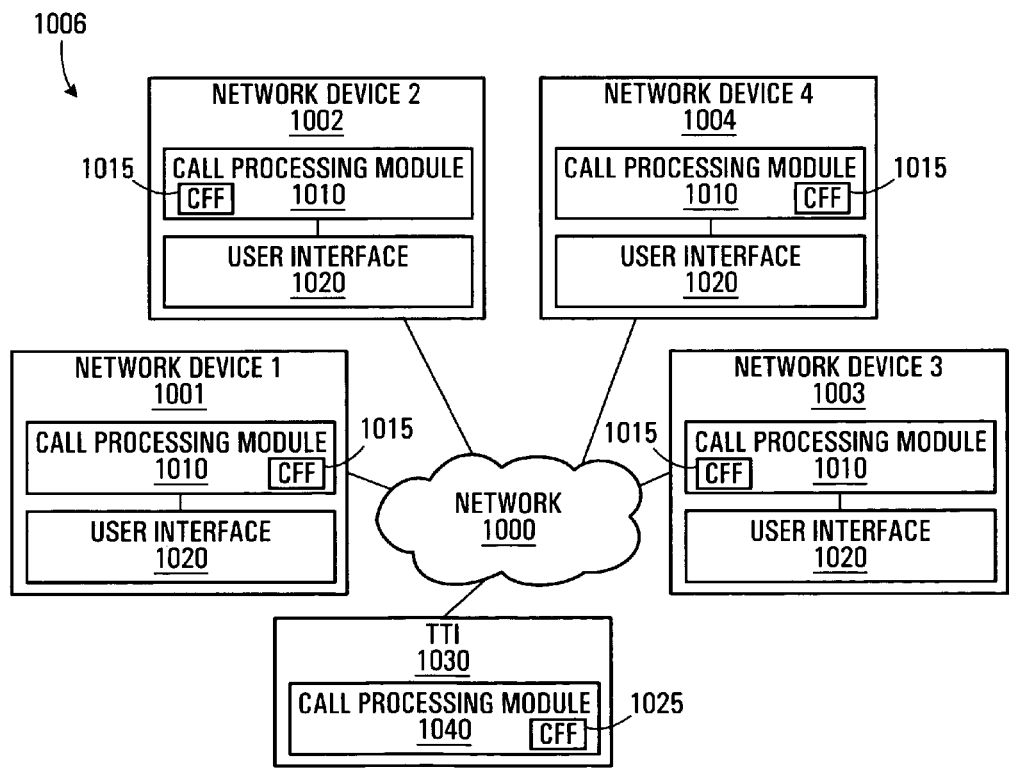
FIG. 7B is another basic block diagram of a distributed peer-to-peer network.
Figure 8C:
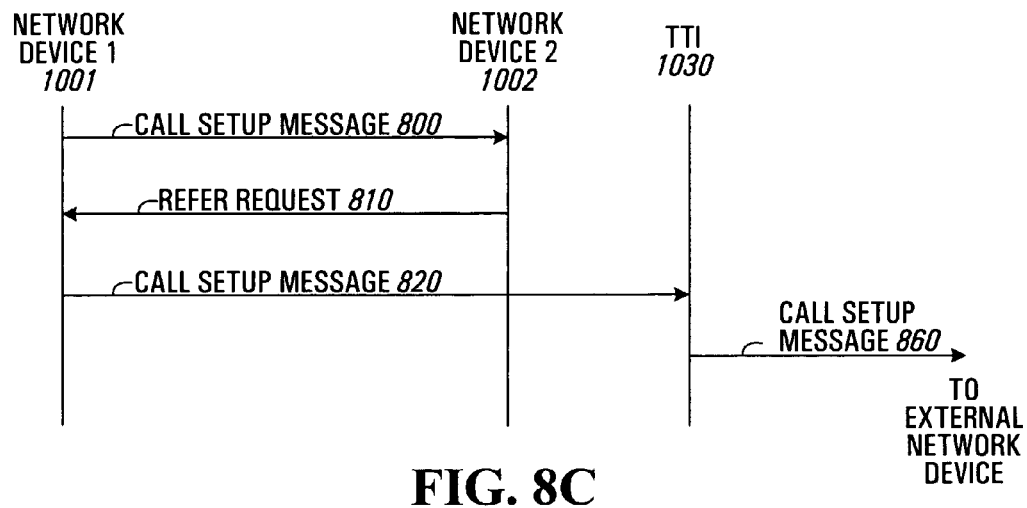
FIG. 8C is a signal flow diagram of the basic steps which take place in a call forwarding scenario, according to another embodiment of the invention.
Figure 8D:
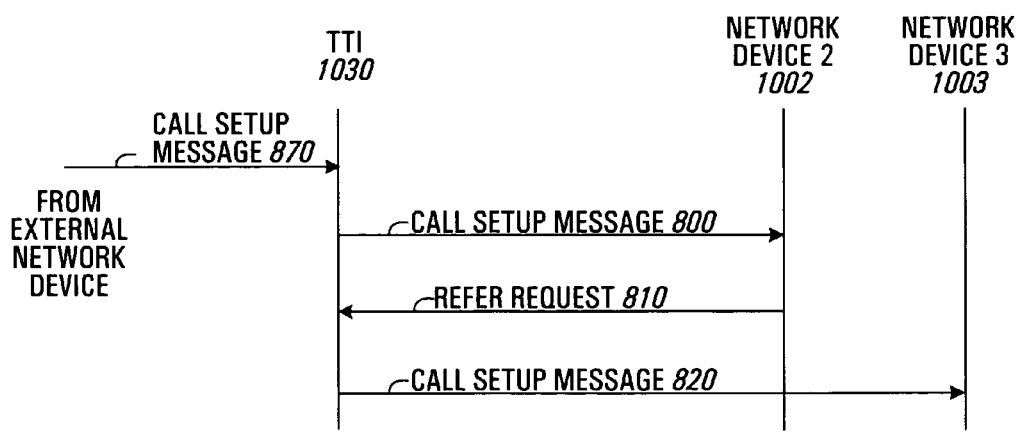
FIG. 8D is a signal flow diagram of the basic steps which take place in a call forwarding scenario, according to another embodiments of the invention.

As shown in FIG. 7B, there is a TTI 1030 having a call processing module 1040, which is connected to the network 1000. The call processing module 1040 is capable of directing calls between the network devices 1001, 1002, 1003, 1004 and external network devices (not shown) outside the network 1000. Furthermore, the call processing module 1040 of the TTI 1030 has a CFF 1025 that participates in call forwarding of calls to and from the external network devices by providing local call forwarding functionality as a forwardee or an originator, respectively, for the external network devices outside the network. For example, in FIG. 8C a signaling sequence similar to that of FIG. 8A is shown except that the third network device 1003 of FIG. 8A is replaced with the TTI 1030. In particular, in this case the TTI 1030 provides call forwarding functionality as a forwardee on behalf of an external device (not shown) external to the network 1000. In particular, in FIG. 8C the refer request contains a call forwarding destination for the external network device and the call setup message is sent to the TTI 1030. In FIG. 8C, the TTI 1030 then sends a call setup message 860 to the external network device to initiate a call. Alternatively, depending on a gateway mechanism used by the TTI 1030, the TTI 1030 relays the call setup message 820 to the external network device. The call setup message being relayed might be in the form of any suitable signaling or messaging. Note that in some embodiments of the invention the TTI 1030 is adapted to provide local call forwarding functionality on behalf of the external network device in accordance with the messaging of FIG. 8B.

In another example, the TTI 1030 participates in a call forwarding of a call from an external network device outside the network 1000 directed to the second network device 1002. In particular, the call is forwarded to the third network device 1003. In such a case, in FIG. 8D the TTI 1030 follows the same messaging sequence followed by the first network device 1001 as shown in FIG. 8A except that a call setup message 870 is received by the TTI 1030 from an external network device (not shown). The TTI 1030 receives the call setup message 870 and initiates a call with the second network device 1002 by way of call setup message 800. Alternatively, depending on a gateway mechanism used by the TTI 1030, the TTI 1030 relays the call setup message 870 to the second network device 1002. Upon receipt of the refer request 810, the TTI 1030 sends call setup message 820 to the third network device 1003. Note that in some embodiments of the invention the TTI 1030 is adapted to provide local call forwarding functionality on behalf of the external network device in accordance with the messaging of FIG. 8B.

In FIGS. 7A and 7B there are four network devices 1001, 1002, 1003, 1004; however, in other embodiments of the invention any appropriate number of network devices can be employed. Furthermore, in FIG. 7B there is only one TTI 1030; however, in other embodiments of the invention any appropriate number of TTIs can be employed.

Further embodiments will be now described with reference to FIGS. 9 and 11 to 13. In FIGS. 9 and 11 to 13 messaging between network devices will be described for example implementations in the context of SIP (Session Initiation Protocol); however, the invention is not limited to implementations using SIP. For example, in some implementations the H. 323 (packet based communication system standard communication system) standard is used. Furthermore, in FIGS. 9, 10, and 11 to 13, call forwarding is applied to network devices 1001, 1002, 1003, 1004 of FIGS. 7A and 7B; however, the call forwarding functionality is also equally applicable to any network device such as terminal sets 101, 102, 103, 104, 105 of FIG. 1 for example.

Figure 9:
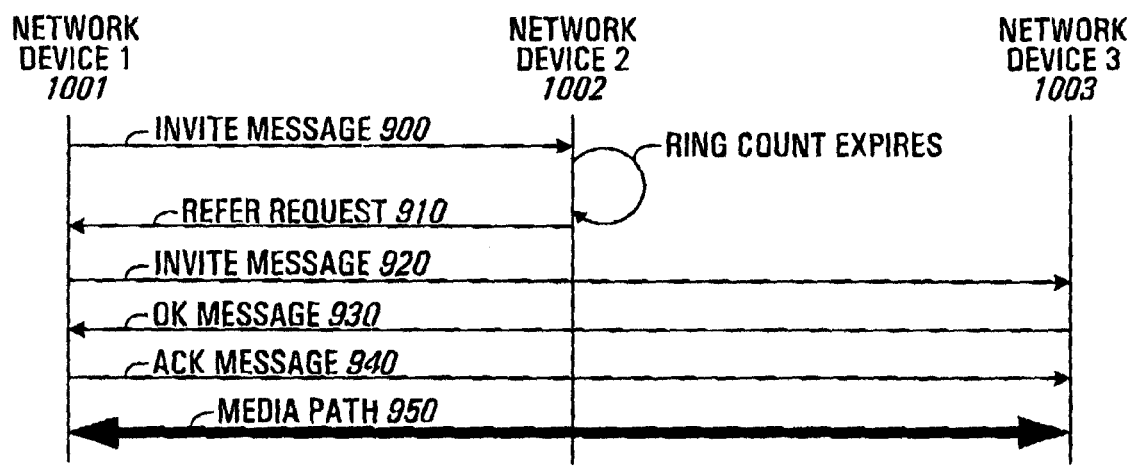
FIG. 9 is a signal flow diagram of an example implementation of call forwarding in a distributed peer-to-peer network, according to another embodiment of the invention.

An example implementation of messaging for call forwarding in a distributed peer-to-peer network is shown in FIG. 9. In the example, the first network device 1001 calls the second network device 1002 by sending an INVITE message 900 for an incoming call. The second network device 1002 processes the INVITE message 900 and determines whether or not the call requires to be forwarded. In the example of FIG. 9, each network device 1001, 1002, 1003, 1004 is assumed to have an audio interface (not shown) adapted to generate a ringing signal upon receipt of the incoming call. In the example, a ring count expires triggering call forwarding. A call forwarding destination for the third network device 1003 is looked-up and packed in a REFER request 910 which is sent back to the first network device 1001. Upon receipt of the REFER request 910 the first network device 1001 sends a new INVITE message 920 to the third network device 1003 which corresponds to the call forwarded destination provided by the second network device 1002 in the REFER request 910. The third network device 1003 answers the INVITE message 920 from the first network device 1001 by sending an OK message 930. The first network device 1001 then sends an ACK (ACKnowledge) message 940 to the third network device 1003 and a media path 950 between the first and third network devices 1001, 1003 is established. The third network device 1003 processes the call from the first network device 1001 and optionally displays the intended recipient of the call. Alternatively, upon receiving the INVITE message 920, the third network device 1003 forwards the call using the same procedure as that used by the second network device 1002.

Figure 10:
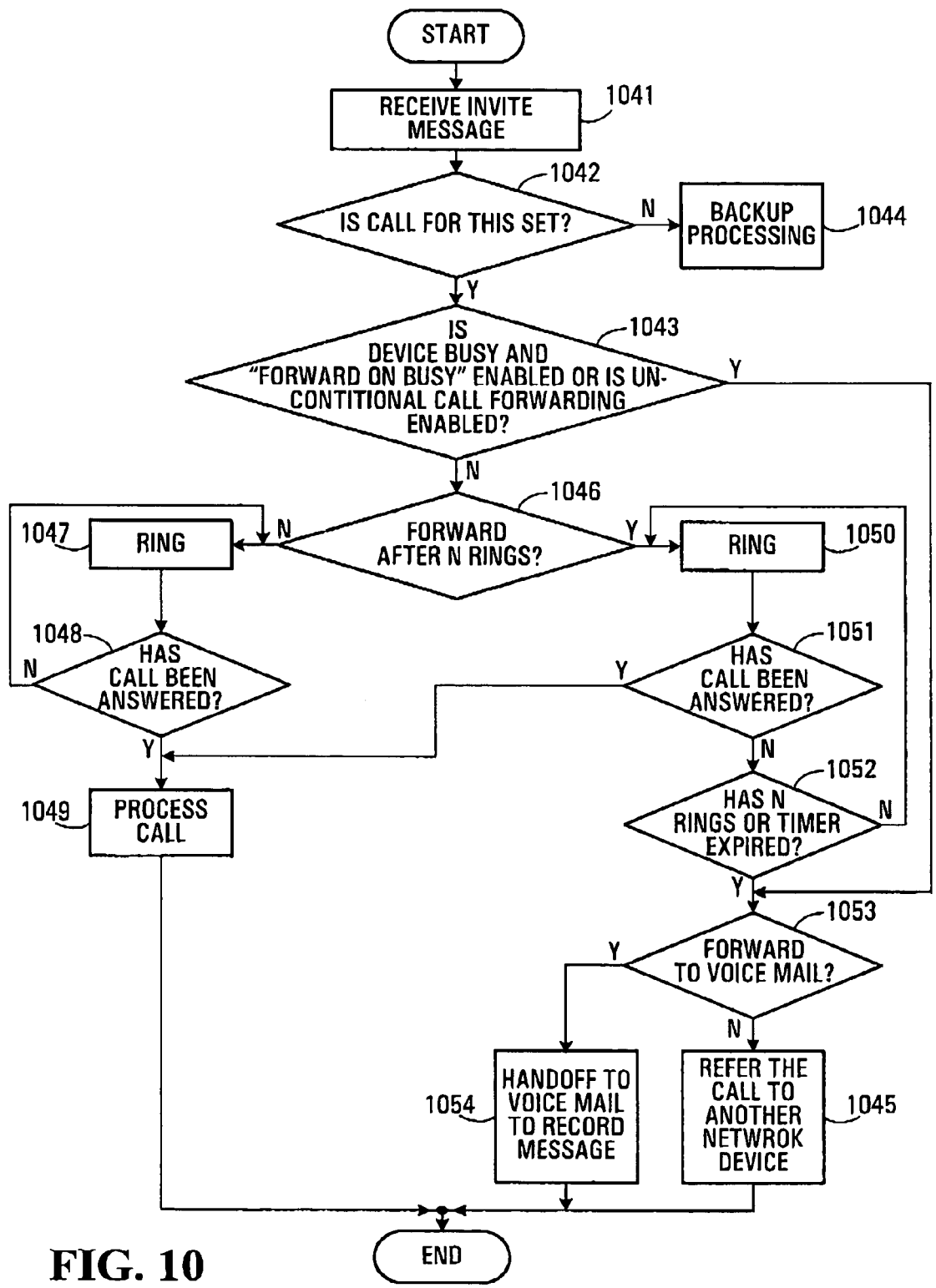
FIG. 10 is a flow chart of a method of determining whether or not a call requires to be forwarded, according to another embodiment of the invention.

Referring to FIG. 10, and with further reference to FIG. 9, shown is a flow chart of a method of determining whether or not a call requires to be forwarded. In particular, the flow chart of FIG. 10 is used to describe a method of determining whether or not a call associated with the INVITE message 900 of FIG. 9 from the first network device 1001 to the second network device 1002 requires to be forwarded. The second network device 1002 receives the INVITE message 900 (step 1041) and at step 1042 if the call associated with the INVITE message 900 is not intended for the second network device 1002 then call is handled for backup processing (step 1044). At step 1044, the call may be forwarded to another network device or processed for voice mail for example. In one example implementation if the network device receiving the call is designated as a backup for the network device for which the call intended then if voicemail or call forwarding is enabled then the call is then processed for voice mail or forwarded, respectively; otherwise, a busy message is sent. At step 1042, if the call associated with the INVITE message 900 is intended for the second network device 1002 then the second network device 1002 determines whether it is busy and "forward on busy" is enabled or whether it has unconditional call forwarding enabled (step 1043).

At step 1043, f the second network device 1002 is busy and "forward on busy" is enabled or if unconditional call forwarding is enabled then step 1043 is performed.

At step 1043, if unconditional call forwarding has not been enabled then the second network device 1002 checks to see if a call forwarding after N rings option has been enabled (step 1046) where N is an integer satisfying N≧1 with N preferably satisfying N=4. If the call forwarding after N rings option has not been enabled the second network device 1002 enables its ringer and waits for a user at network device 1002 to answer the call (steps 1047, 1048). At step 1048, if the call is answered it is processed (step 1049).

At step 1046, if the call forwarding after N rings option has been enabled then the second network device 1002 starts its ringer (step 1050). At step 1051, if the call is answered it is processed (step 1049); otherwise, the second network device 1002 determines whether the number of rings reached N rings or whether a timer has expired (step 1052). If the number of ring has not reached N rings, ringing continues (step 1050). In the case when either the timer has expired or the specified number of rings has reached N rings then at steps 1053 if forward to voice mail is enabled the call is handed to a voice mail module for further processing (step 1054); otherwise, the call forwarding destination is packed in the REFER request 910 and the REFER request 910 is sent to the first network device 1001 (step 1045). In particular, at step 1045 the call is referred to another network device corresponding to the third network device 1003 in this example, by looking up a call forwarding destination and sending the call forwarding destination as part of the REFER request 910 which is sent to the first network device 1001.

Figure 11:
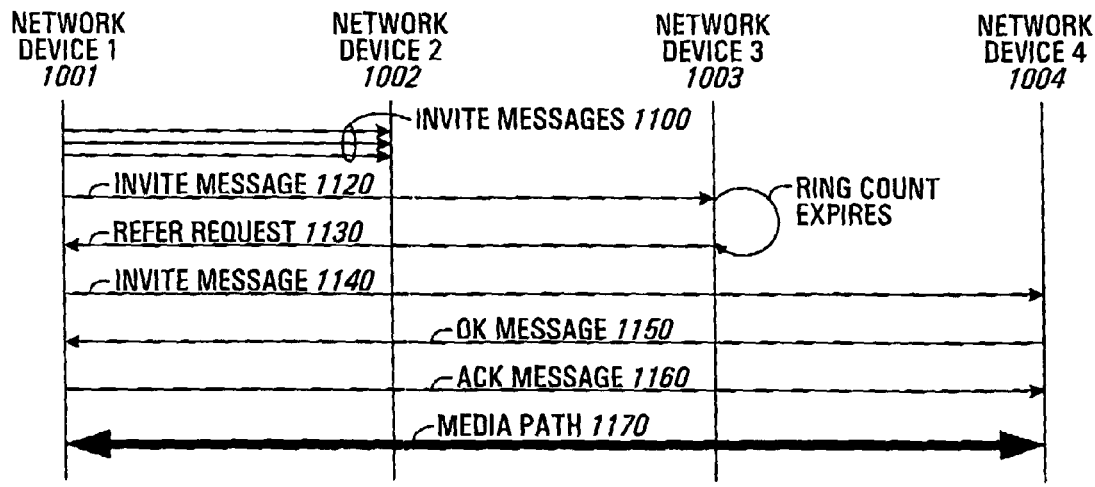
FIG. 11 is a signal flow diagram of an example implementation of call forwarding in a distributed peer-to-peer network when a target network device cannot be reached.

Referring to FIG. 11, shown is a signal flow diagram of an example implementation of call forwarding in a distributed peer-to-peer network when a target network device is cannot be reached. In the example of FIG. 11, the target network device which corresponds to the second network device 1002, cannot be reached. This might be due to network failure, network device failure, or the network device being unplugged or having a lack of resources, for example. The first network device 1001 attempts to contact the second network device 1002 with successive INVITE messages 1110 but the second network device 1002 does not respond. The first network device 1001 maintains destination addresses for backup network devices and after several attempts looks up a destination address of a first backup for the second network device 1002. For the purposes of this example, the first backup corresponds to the third network device 1003. The first network device 1001 sends an INVITE message 1120 to the third network device 1003. In some implementations, the first network device 1001 looks-up the status of the third network device 1003 to determine whether INVITE message 1120 is to be sent or not. The INVITE message 1120 is processed in a similar manner as described above with reference to FIG. 8A; however, in this case the call was originally intended for the second network device 1002. As such the third network device 1003 looks-up a call forwarding destination on behalf of the second network device 1002. Preferably, the call forwarding destination is looked up locally in a table which is maintained by the third network device 1003. Alternatively, the call forwarding destination might be looked up at a central location. In this particular example, the call forwarding destination corresponds to the fourth network device 1004. The third network device 1003 packs the call forwarding destination for the fourth network device 1004 in a REFER request 1130 and sends the REFER request 1130 to the first network device 1001. In some cases call forwarding to voice mail is enabled in which case the call is processed using voice mail. The REFER request 1130 is sent back to the first network device 1001 and after unpacking the REFER request 1130, the first network device 1001 sends a new INVITE message 1140 to the fourth network device 1004. The fourth network device 1004 answers the INVITE message 1140 from the first network device 1001 by sending an OK message 1150. The first network device 1001 replies to the fourth network device 1004 with an ACK message 1160 and a media path 1170 is established. Once the media path 1170 is established, the fourth network device 1004 processes the call and optionally displays the intended recipient of the call, which happens to be the second network device 1002 in this example. Alternatively, upon receiving the INVITE message 1140, the fourth network device 1004 may forward the call using the same procedure as that used by the third network device 1003.

In the example implementation of FIG. 11, the first network device 1001 maintains destination addresses of backup network devices. In one implementation these backup network devices are preferably defined as discussed above with reference to FIGS. 1 to 6 in which backup functionality is provided not only for purposes of call forwarding but also for other call processing features such a voice mail for example; however, it is to be understood that for purposes of call forwarding in other implementations the backup network devices are defined separately from backup network devices defined for other call processing features.

Figure 12:
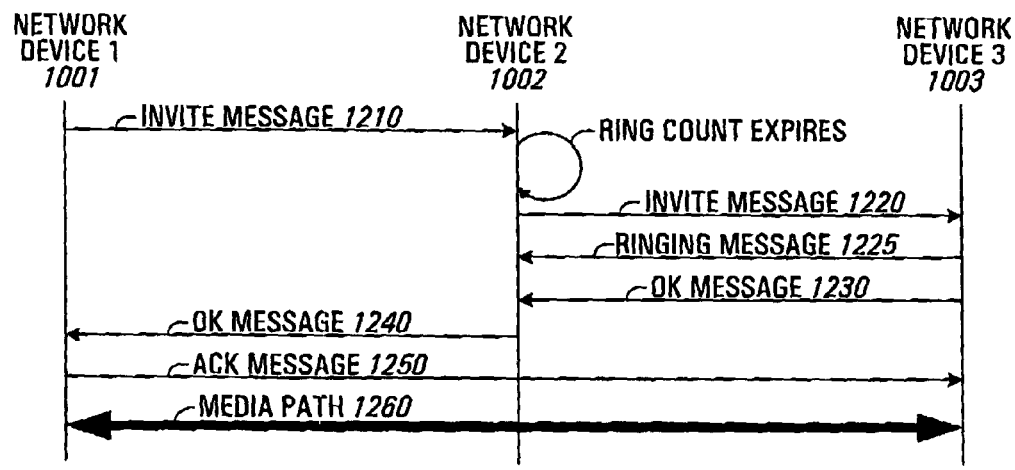
FIG. 12 is a signal flow diagram of an example implementation of call forwarding in a distributed peer-to-peer network, according to another embodiment of the invention.

Referring to FIG. 12, shown is a signal flow diagram of an example implementation of call forwarding in a distributed peer-to-peer network, according to another embodiment of the invention. In the example implementation of FIG. 12, the first network device 1001 calls the second network device 1002 by sending INVITE message 1210. The second network device 1002 processes the INVITE message 1210 and determines whether or not a call associated with the INVITE message 1210 requires to be forwarded, as described herein above with reference to FIG. 10 for example. In the case when the call requires to be forwarded, a call forwarding destination is looked up and an INVITE message 1220 is sent by the second network device 1002 to a call forwarding destination associated with the third network device 1003. The third network device 1003 processes the call initiated by the INVITE message 1220 and optionally displays the intended recipient of the call, which happens to be the second network device 1002. The third network device 1003 responds to the INVITE message 1220 with a RINGING message 1225 sent to the second network device 1002 and when a user at the third network device 1003 answers the call, an OK message 1230 is sent back to the second network device 1002 to indicate that the call has been answered. Upon receiving the OK message 1230 from the third network device 1003, the second network device 1002 sends an OK message 1240 containing a reference to the third network device 1003. The reference might be for example an IP address, an IP address and port number, or a DN (Directory Number) of the third network device 1003 for example. In some embodiments of the invention, the OK message 1230 also contains contact information, an identification of ports of the third network device, and media information. The first network device 1001 then completes the call set up by sending an ACK message 1250 directly to the third network device 1003 instead of completing the call set up through the second network device 1002. A media path 1260 is then established.

In FIG. 12, the OK message 1240 contains a reference to the third network device 1003 and in FIG. 9 the refer request 910 contains a call forwarding destination of the third network device 1003. More generally, a message sent from the second network device 1002 to the first network device 1001 contains destination information of the third network device, the destination information being a reference to the third network device 1003 or a call forwarding destination of the third network device 1003.

In some embodiments of the invention, the INVITE message 1220 contains a reference to the first network device 1001 and the OK message 1230 is sent directly to the first network device 1001 instead of the second network device 1002.

Figure 13:
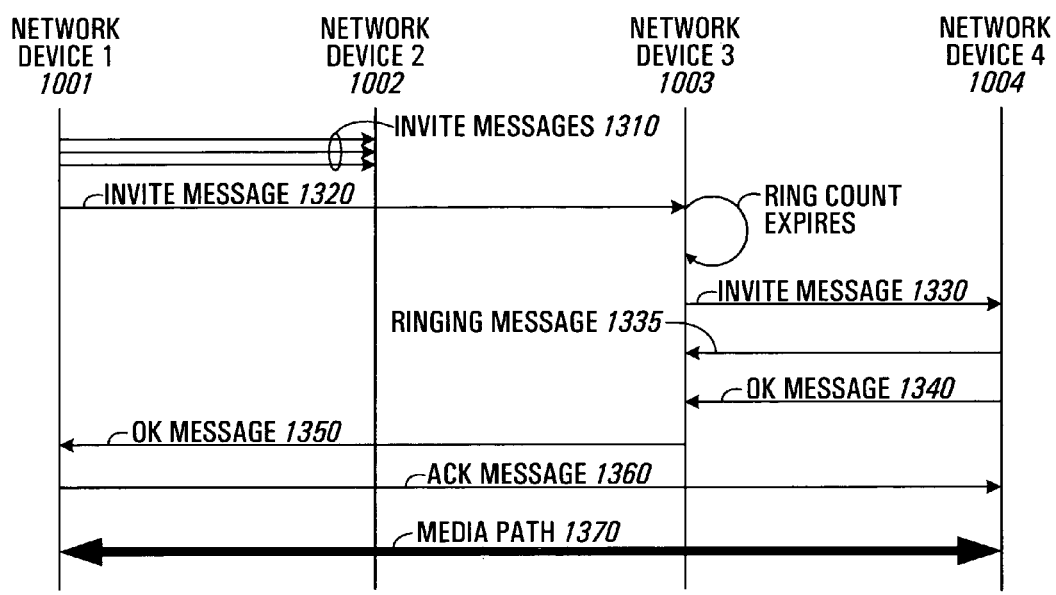
FIG. 13 is a signal flow diagram of an example implementation of call forwarding in a distributed peer-to-peer network when a target network device cannot be reached.

Referring to FIG. 13, shown is a signal flow diagram of an example implementation of call forwarding in a distributed peer-to-peer network when a target network device cannot be reached. In this example, the target network device corresponds to the second network device 1002, which cannot be reached. This might be due to partial network failure, network device failure, or the network device being unplugged or having a lack of resources for example. The first network device 1001 attempts to contact the second network device 1002 by sending INVITE messages 1310 but the second network device 1002 does not respond. After several attempts at establishing a connection by sending INVITE messages 1310, the first network device 1001 looks up its routing table (not shown), retrieves a destination address of a first backup for the second network device 1002 which, for the purposes of this example, is shown to be the third network device 1003. The first network device 1001 then sends a INVITE message 1320 to the third network device 1003. The INVITE message 1320 is processed in a similar manner as described herein above with reference to FIG. 10 to determine whether a call associated with the INVITE message 1320 sent to the third network device 1003 requires to be forwarded. If the call requires to be forwarded, a call forwarding destination for the fourth network device 1004 is looked by the third network device 1003 on behalf of the second network device 1002 and an INVITE message 1330 is sent by the third network device 1003 to the fourth network device 1004. The fourth network device 1004 processes the call and optionally displays an intended recipient of the call, which corresponds to the second network device 1002. The fourth network device 1004 responds to the INVITE message 1330 sent by the third network device 1003 with a RINGING message 1335 and when a user at the fourth network device 1004 answers the call, the fourth network device 1004 sends an OK message 1340 back to the third network device 1003 to indicate that the call has been picked up. Upon receiving the OK message 1340 from the fourth network device 1004, the third network device 1003 sends an OK message 1350 containing a call forwarding destination for the fourth network device 1004 to the first network device 1001. The call forwarding destination might be for example an IP address or a DN. Furthermore, in some embodiments, the OK message 1350 also contains contact information and an identification of ports of the fourth network device 1004. Upon receipt of the OK message 1350, the first network device 1001 then completes a call set up with an ACK message 1360 which is sent to the fourth network device 1004. Once the ACK message 1360 is received by the fourth network device 1004, a media path 1370 is established.

The forgoing merely illustrates the principles of the invention and it will thus be appreciated that those skilled in the art will be able to devise numerous alternative arrangements, which, although not explicitly described herein, embody the principles of the invention and are within its spirit and scope. For example, the inventive concept was described for a distributed or particularly distributed systems; however, in some embodiments of the invention network devices have local call forwarding functionality and are implemented in non-distributed or partially distributed systems.

Numerous modifications and variations of the present invention are possible in light of the above teachings. It is therefore to be understood that within the scope of the appended claims, the invention may be practised otherwise than as specifically described herein.

The invention claimed is:

1. A network device adapted to receive an incoming call, the network device comprising:
   a call forwarding function adapted to:
   if the incoming call received at the network device was intended for an other network device, look-up a call forwarding destination on behalf of the other network device, and respond to the incoming call with the call forwarding destination, the network device further comprising:
   a call processing module adapted to process the incoming call, the processing module comprising the call forwarding function, and
   a user interface adapted to receive a user input enabling call forwarding, wherein responsive to the user input the call processing module is further adapted to deliver call forwarding functionality by, while call forwarding is enabled, upon receipt of the incoming call:
   if the incoming call was intended for the network device, looking-up an other call forwarding destination and responding to the incoming call with the other call forwarding destination.

2. A network device adapted to receive an incoming call, the network device comprising:
   a call processing function adapted to:
   if the incoming call received at the network device was intended for the network device, enable a user to answer the incoming call at the network device; and
   a call forwarding function adapted to:
   if the incoming call received at the network device was intended for an other network device, look-up a call forwarding destination on behalf of the other network device, and initiate a connection with a network device having the call forwarding destination.

3. The network device according to claim 2 wherein the call forwarding function is adapted to provide call forwarding information to another network device defined as a backup for the network device.

4. The network device according to claim 2 wherein the network device is defined as a backup network device for the other network device.

5. The network device according to claim 2 wherein the look-up is performed locally at the network device.

6. The network device according to claim 2 comprising a call processing module adapted to process the incoming call, the processing module comprising the call forwarding function and the call processing function.

7. A network device adapted to receive an incoming call, the network device comprising:
   a call forwarding function adapted to: if the incoming call received at the network device was intended for an other network device, look-up a call forwarding destination on behalf of the other network device, and initiate a connection with a network device having the call forwarding destination;
   a call processing module adapted to process the incoming call, the processing module comprising the call forwarding function; and
   a user interface adapted to receive a user input enabling call forwarding, wherein responsive to the user input the call processing module is further adapted to deliver call forwarding functionality by, while call forwarding is enabled, upon receipt of the incoming call:
   if the incoming call was intended for the network device, looking-up an other call forwarding destination and initiate a connection with a network device having the other call forwarding destination.

8. The network device according to claim 2 wherein the call forwarding function is adapted to send a message to a network device from which the incoming call originates, the message containing a reference to the network device having the call forwarding destination.

9. The network device according to claim 2 wherein the network device is one of a terminal set, a packet based telephone, a video phone, a PC (Personal Computer), a PDA (Personal Digital Assistant), a soft phone, a wireless device, and a wireless telephone.

10. A network device adapted to receive an incoming call, the network device comprising:
a call forwarding function adapted to:
if the incoming call received at the network device was intended for an other network device, look-up a call forwarding destination on behalf of the other network device, and initiate a connection with a network device having the call forwarding destination,
wherein the network device is a VoIP (Voice over Internet Protocol) telephone.

11. A network device adapted to participate in call forwarding, the network device comprising:
a call forwarding function adapted to:
for a call initiated with a first other network device, if the first other network device cannot be reached:
i) look-up a destination address for a second other network device;
ii) initiate an other call to the second other network device; and
iii) responsive to receiving a first message from the second other network device containing a call forwarding destination, respond with a second message to a network device having the call forwarding destination for setting up another call, the call forwarding destination being obtained by the second other network device on behalf of the first network device.

12. The network device according to claim 11 wherein the call forwarding function is further adapted to:
for the call initiated with the first other network device, if the first other network device can be reached:
responsive to receiving a third message from the first other network device containing the call forwarding destination, send a fourth message to the network device having the call forwarding destination for setting up a call.

13. A network device adapted to participate in forwarding of a call from the network device to a first other network device, the network device comprising:
a call forwarding function adapted to:
responsive to receiving a first message from a second other network device for replacing the call with another call with the second network device, establishing a media path with the second other network device.

14. The network device according to claim 13 wherein the call forwarding function is further adapted to:
if the first other network device cannot be reached:
i) look-up a new destination address;
ii) initiate a call with a network device having the new destination address; and
iii) responsive to receiving a first message from the network device having the new destination address, the first message containing a call forwarding destination, send a second message to a network device having the call forwarding destination for setting up a call, the call forwarding destination being obtained by the network device having the new destination address on behalf of the first network device.

15. A network device adapted to participate in call forwarding of call from a first other network device to a second other network device, the second other network device initiating an other call to the network device, the network device comprising a call forwarding function adapted to:
establish a media path with the first other network device.

16. A system in a network comprising:
a plurality of network devices each capable of accessing the network, each network device comprising a call forwarding function adapted to:
a) as an original destination network device, upon receipt of a first call;
i) look-up a call forwarding destination; and
ii) provide destination information associated with the call forwarding destination to a network device from which the first call originates; and
b) as an originator network device of a second call:
responsive to receiving a message containing destination information of an other network device, establish a media path with the other network device.

17. The system according to claim 16 wherein for each network device the call forwarding function is adapted to:
as the originator network device, the establishing a media path with the other network device comprises sending a message to the other network device containing a reference to the second call.

18. The system according to claim 16 wherein for each network device, as the original destination network device the call forwarding function is adapted to:
if the first call is not intended for the network device, looking-up the call forwarding destination on behalf of an other network device for which the first call is intended.

19. The system according to claim 16 wherein for each network device:
c) as a forwardee network device of a third call from a first other network device to a second other network device, the second other network device initiating a fourth call to the network device, the call forwarding function is further adapted to:
establish a media path with the first other network device.

20. The system according to claim 16 further comprising:
a TTI (Thin Trunk Interface) having a call forwarding function adapted to provide local call forwarding functionality as a forwardee of a call for a network devices external to the network.

21. The system according to claim 16 further comprising:
a TTI (Thin Trunk Interface) having a call forwarding function adapted to provide local call forwarding functionality as an originator of a call for a network device external to the network.

22. The system according to claim 16 wherein for each network device:
the second call is to a first other network device and as the originator network device the call forwarding function is adapted to:
if the first other network device cannot be reached, look-up an address for a second other network device and send a message to the second other network device for setting up a call with the second other network device.

23. The system according to claim 16 wherein each network device is one of a terminal set, a packet based telephone, a video phone, a PC (Personal Computer), a PDA (Personal Digital Assistant), a soft phone, a wireless device, and a wireless telephone.

24. The system according to claim 16 wherein each network device is a VoIP (Voice over Internet Protocol) telephone.

25. A system in a network comprising;
a plurality of network devices each capable of accessing the network, each network device comprising a call forwarding function adapted to:

a) as an original destination network device, upon receipt of a first call:
  i) look-up a call forwarding destination; and
  ii) send a first message to a network device having the call forwarding destination for setting up a call with the network device having the call forwarding destination; and
b) as an originator network device of a second call:
responsive to receiving a second message containing destination information of an other network device, establish a media path with the other network device.

26. The network device according to claim 25 wherein for each network device:
as the original destination network device, the call forwarding function is adapted to send a third message to a network device from which the first call originates, the third message containing a reference to the network device having the call forwarding destination.

27. An article of manufacture comprising:
a computer usable medium having computer readable program code means embodied therein, the computer readable code means in the article of manufacture comprising:
computer readable code means for:
in a network device, responsive receiving an incoming call:
if the incoming call was intended for an other network device, looking-up a call forwarding destination on behalf of the other network device, and responding to the incoming call with the call forwarding destination,
wherein the computer readable code means in the article of manufacture further comprises computer readable means for:
responsive to receiving a user input enabling call forwarding, delivering call forwarding functionality by, while call forwarding is enabled, upon receipt of the incoming call:
if the incoming call was intended for the network device, looking-up an other call forwarding destination and responding to the incoming call with the other call forwarding destination.

28. An article of manufacture comprising:
a computer usable medium having computer readable program code means embodied therein, the computer readable code means in the article of manufacture comprising:
computer readable code means for:
in a network device, responsive receiving an incoming call:
if the incoming call was intended for an other network device, looking-up a call forwarding destination on behalf of the other network device, and responding to the incoming call with the call forwarding destination,
wherein the computer readable code means in the article of manufacture further comprises:
computer readable means for initiating an other call to an other network device; and
computer readable means for:
responsive to receiving a first message in response to initiating the other call, the first message containing a first other call forwarding destination, sending a second message to a network having the first other call forwarding destination to set up a connection.

29. The article of manufacture according to claim 28 wherein the computer readable code means in the article of manufacture further comprises computer readable means for:
if there is no response to the first message, looking-up a second other call forwarding destination and initiating a call to a network device having the second other call forwarding destination.

30. An article of manufacture comprising:
a computer usable medium having computer readable program code means embodied therein, the computer readable code means in the article of manufacture comprising:
computer readable code means for:
in a network device, responsive receiving an incoming call:
if the incoming call was intended for the network device, enable a user to answer the incoming call at the network device; and
if the incoming call was intended for an other network device, looking-up a call forwarding destination on behalf of the other network device, and initiating a connection with a network device having the call forwarding destination.

31. The article of manufacture according to claim 30 wherein the computer readable code means in the article of manufacture further comprises computer readable means for providing call forwarding information to another network device defined as a backup for the network device.

32. The article of manufacture according to claim 30 wherein the network device is defined as a backup network device for the other network device.

33. The article of manufacture according to claim 30 wherein the computer readable code means in the article of manufacture further comprises computer readable means for performing the look-up locally at the network device.

34. The article of manufacture according to claim 30 wherein the computer readable code means in the article of manufacture further comprises computer readable means for:
responsive to a user input enabling call forwarding, delivering call forwarding functionality by, while call forwarding is enabled, upon receipt of the incoming call:
if the incoming call was intended for the network device, looking-up an other call forwarding destination and initiate a connection with a network device having the other call forwarding destination.

35. The article of manufacture according to claim 30 wherein the network device is one of a terminal set, a packet based telephone, a video phone, a PC (Personal Computer), a PDA (Personal Digital Assistant), a soft phone, a wireless device, and a wireless telephone.

36. The article of manufacture according to claim 30 wherein the network device is a VoIP (Voice over Internet Protocol) telephone.

37. In a network device, a method comprising:
responsive to receiving an incoming call from a first other network device:
if the incoming call was intended for an other network device, looking-up a call forwarding destination on behalf of the other network device, and respond to the incoming call with the call forwarding destination,
wherein responding to the incoming call with the call forwarding destination comprises sending a message to the first other network device identifying the call forwarding destination.

* * * * *